(12) United States Patent
Nagasaka et al.

(10) Patent No.: US 10,789,303 B2
(45) Date of Patent: Sep. 29, 2020

(54) INFORMATIONIMAGE PROCESSING SYSTEM AND INFORMATIONIMAGE PROCESSING METHOD

(71) Applicant: HITACHI, LTD., Tokyo (JP)

(72) Inventors: Yoshiko Nagasaka, Tokyo (JP); Keiro Muro, Tokyo (JP)

(73) Assignee: HITACHI LTD., Tokyo (JP)

( * ) Notice: Subject to any disclaimer, the term of this patent is extended or adjusted under 35 U.S.C. 154(b) by 246 days.

(21) Appl. No.: 15/934,123

(22) Filed: Mar. 23, 2018

(65) Prior Publication Data

US 2019/0065491 A1 Feb. 28, 2019

(30) Foreign Application Priority Data

Aug. 31, 2017 (JP) .................................. 2017-166482

(51) Int. Cl.
| | |
|---|---|
| *G06F 16/93* | (2019.01) |
| *G06F 17/15* | (2006.01) |
| *G06F 16/9038* | (2019.01) |
| *G06F 16/903* | (2019.01) |
| *G06F 40/20* | (2020.01) |
| *G06Q 50/04* | (2012.01) |

(52) U.S. Cl.
CPC .......... *G06F 16/93* (2019.01); *G06F 16/9038* (2019.01); *G06F 16/90335* (2019.01); *G06F 17/15* (2013.01); *G06F 40/20* (2020.01); *G06Q 50/04* (2013.01)

(58) Field of Classification Search
CPC .......... G06F 16/9024; G06F 16/24575; G06F 16/285; G06F 16/288; G06F 16/322; G06F 16/2246; G06F 16/9027
See application file for complete search history.

(56) References Cited

U.S. PATENT DOCUMENTS

| | | | |
|---|---|---|---|
| 2011/0060712 A1* | 3/2011 | Harashima | .......... G06F 16/3344 706/47 |
| 2015/0286712 A1* | 10/2015 | Donndelinger | ....... G06F 16/367 707/701 |

FOREIGN PATENT DOCUMENTS

JP 2016-042214 A 3/2016

* cited by examiner

*Primary Examiner* — Etienne P Leroux
*Assistant Examiner* — Cindy Nguyen
(74) *Attorney, Agent, or Firm* — Volpe and Koenig, P.C.

(57) ABSTRACT

An information processing system includes: a document reception unit configured to receive multiple pieces of document data; a data storage unit configured to store the received multiple pieces of document data; and a correspondence relation estimation unit configured to estimate a correspondence relation at least between an item in a first document data and an item in a second document data out of the multiple pieces of document data stored in the data storage unit. The correspondence relation estimation unit includes an item-item coupling relation extraction unit configured to extract a coupling relation among items in the first document data and a coupling relation among items in the second document data, and a word relationship extraction unit configured to extract a relevance between a word that appears in an item in the first document data and a word that appears in an item in the second document data.

10 Claims, 23 Drawing Sheets

[FIG. 1]
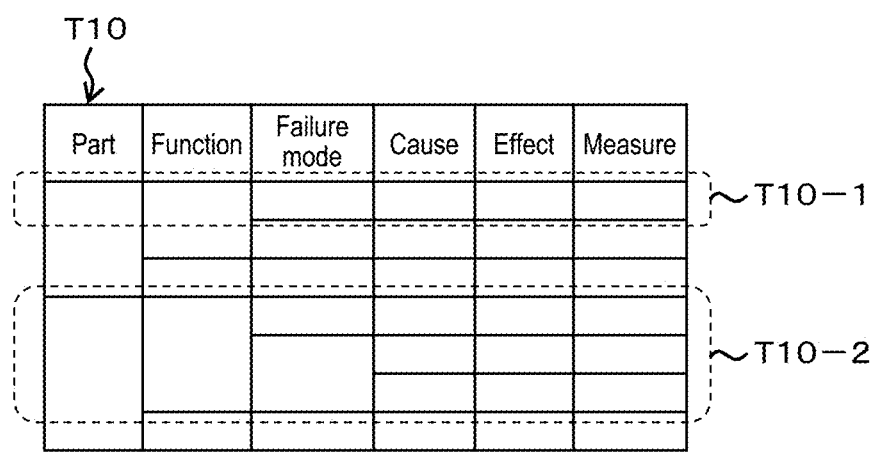

[FIG. 2]
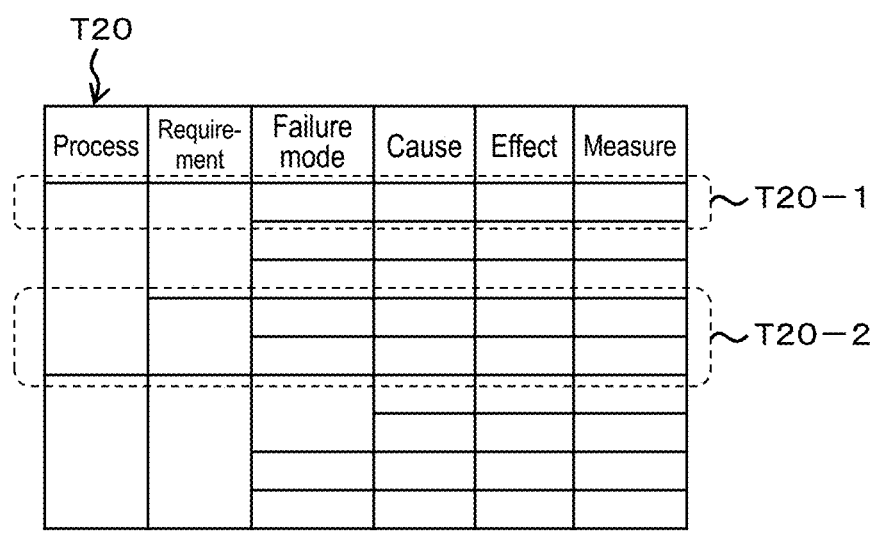

[FIG. 3]
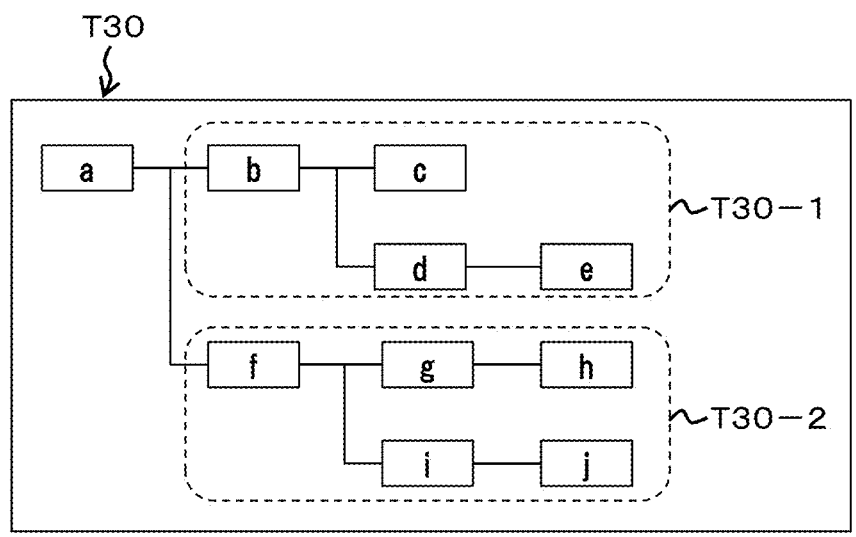

[FIG. 4]
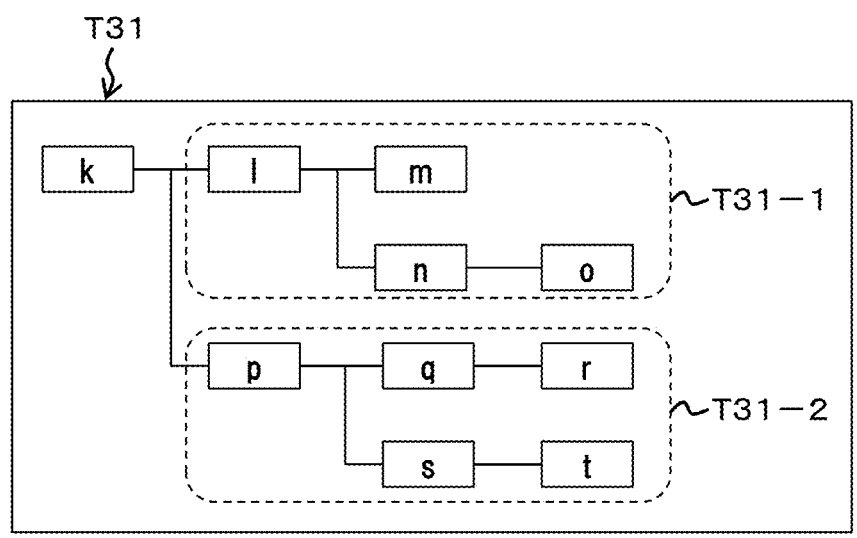

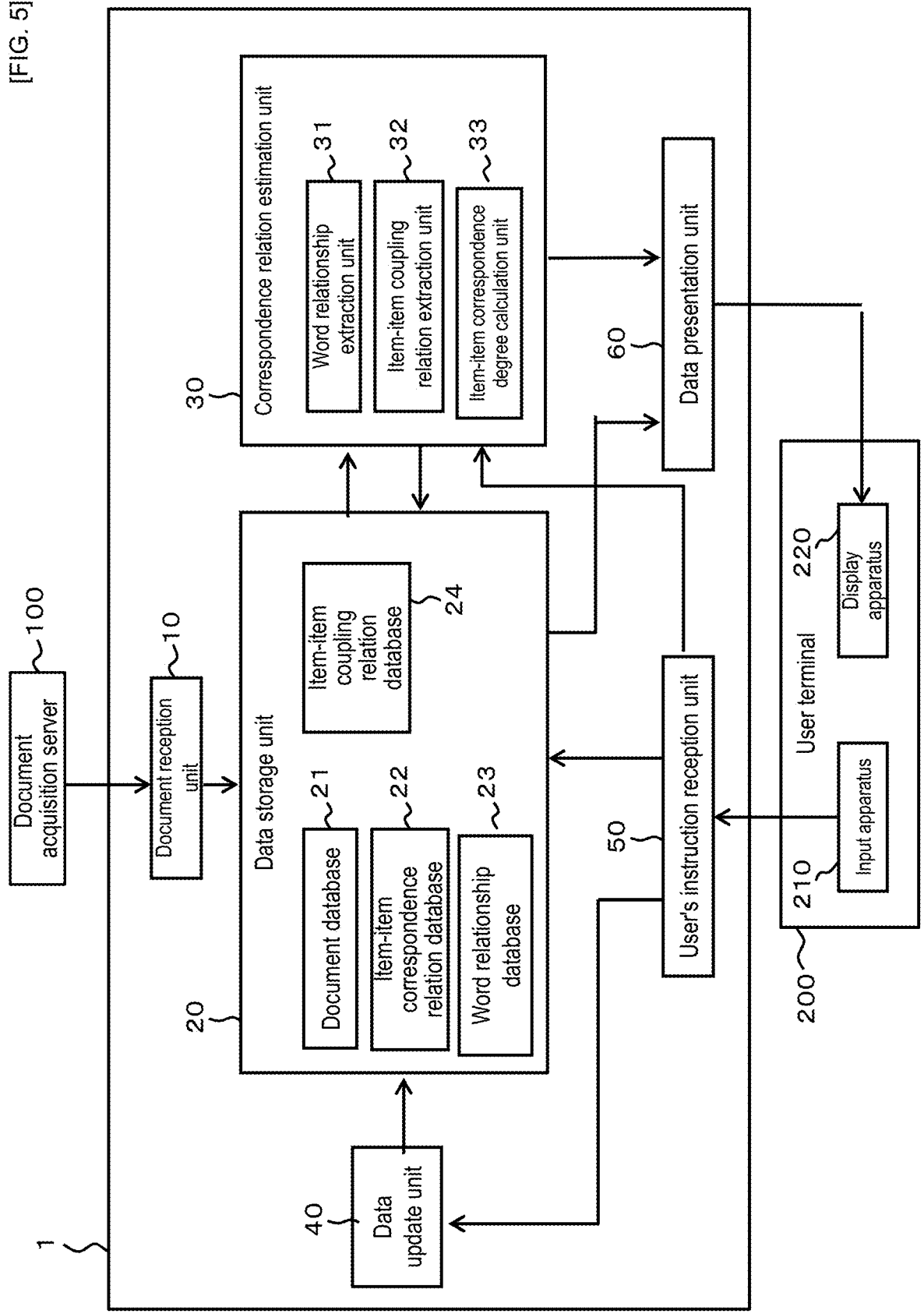

[FIG. 6]
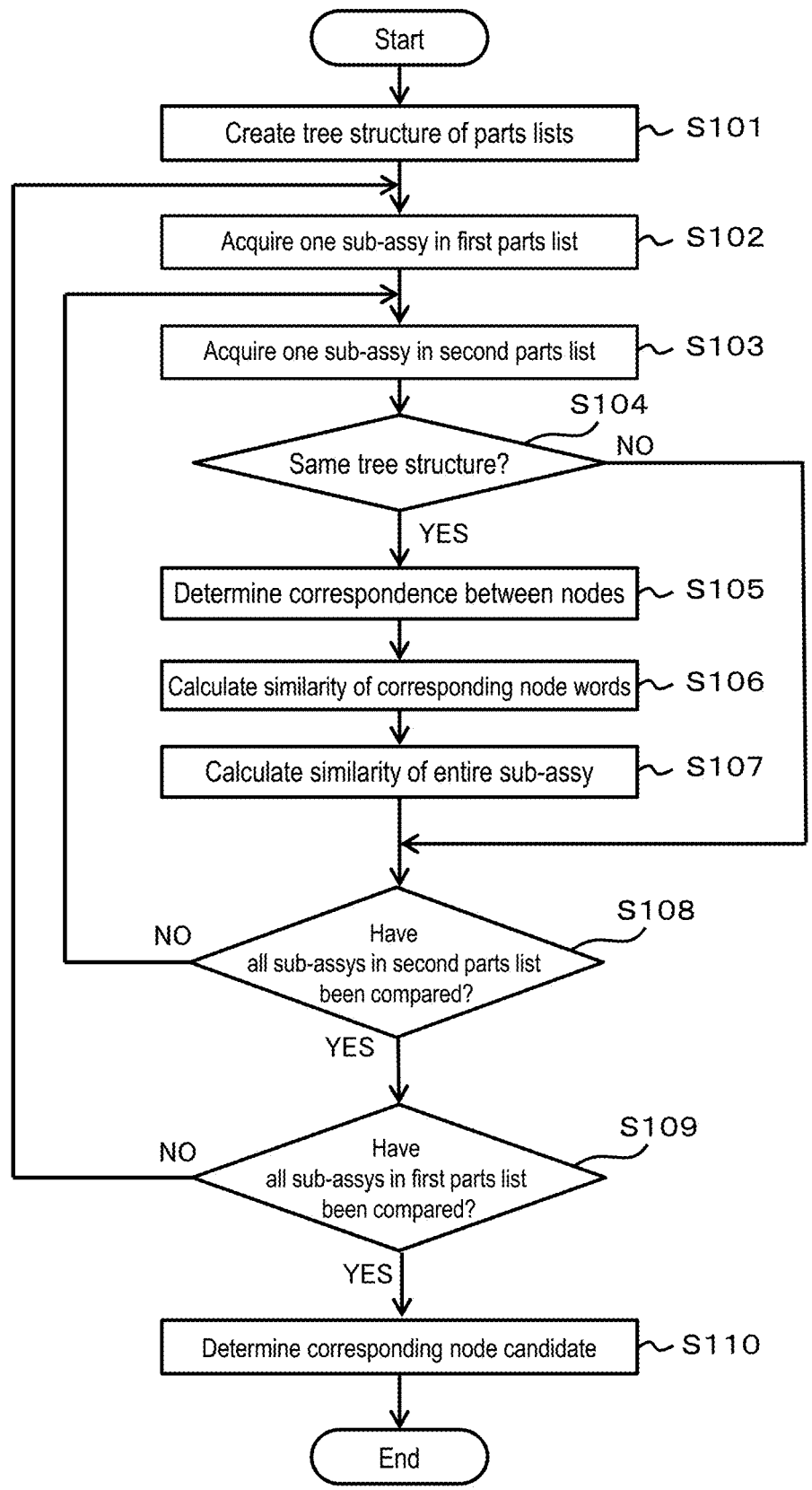

[FIG. 7]

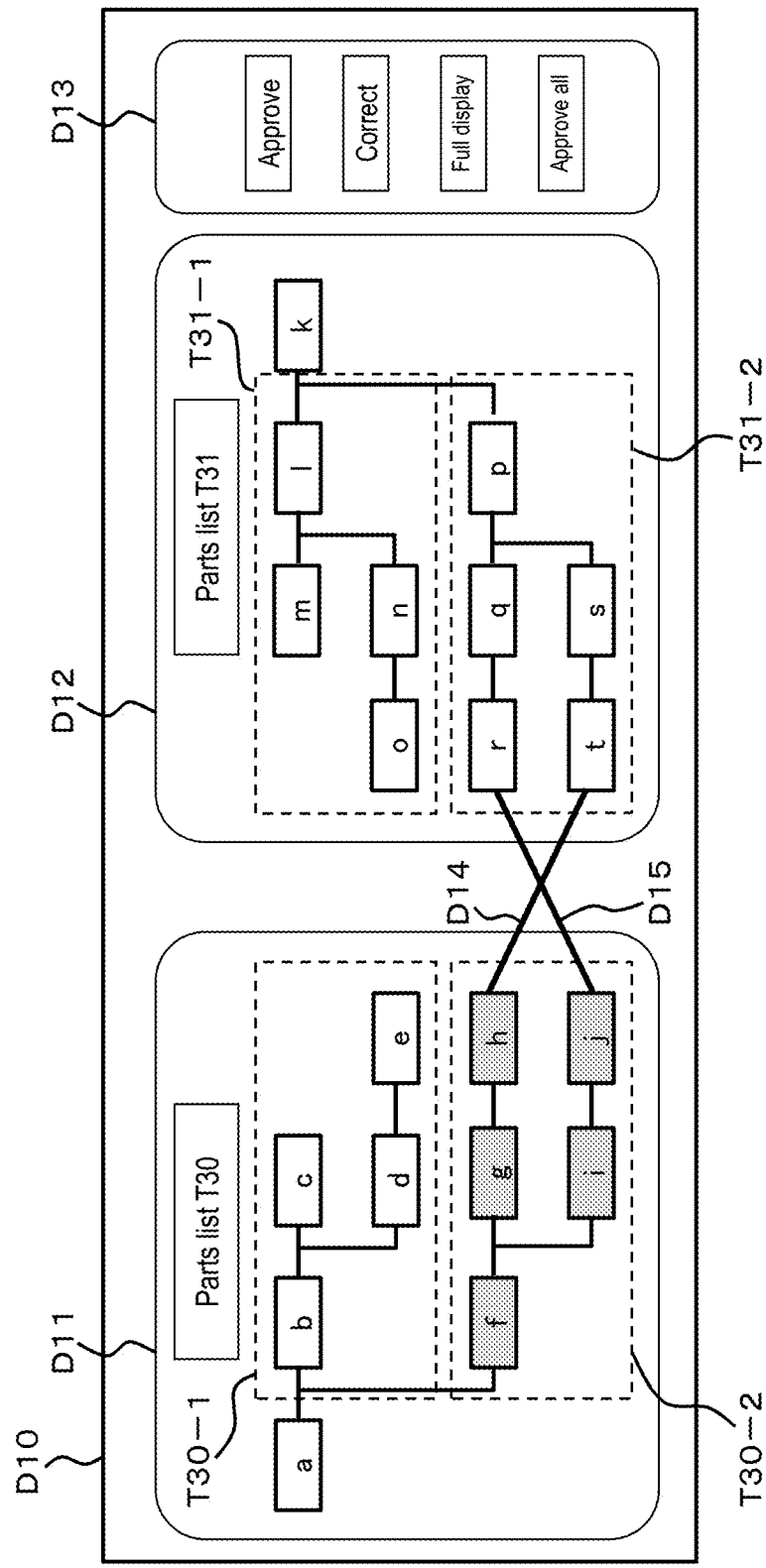

[FIG. 9]

| Part | | | | | |
|------|---|---|---|---|---|
| Function | Failure mode | Cause | Effect | Measure | |

T11

T11-1: (row) — Measure: Penetration amount management
T11-2: (row) — Measure: Dimensional management

| Process | Requirement | Failure mode | | Cause | Effect | Measure |
|---------|-------------|--------------|---|-------|--------|---------|
| | Pipe welding | Non-completion of whole circumferential welding | | Interruption of laser irradiation | | |
| | | Misalignment | | Displacement | | |
| | | Insufficient penetration | | Lens stain | | |
| | Inner diameter | Looseness | | Wear of cutter | | |
| | | | | Measurement error | | |
| | Outer diameter | Not insertable | | Wear of cutter | | |
| | | | | Measurement error | | |

T21 (T21-1: Pipe welding rows; T21-2: Inner diameter rows; T21-3: Outer diameter rows)

| Part | | | | | |
|------|---|---|---|---|---|
| Function | Failure mode | Cause | Effect | Measure | |

T12

T12-1: Measure: Penetration amount management
T12-2: Measure: Dimensional management

| Process | Requirement | Failure mode | | Cause | Effect | Measure |
|---------|-------------|--------------|---|-------|--------|---------|
| | Penetration amount management | Non-completion of whole circumferential welding | | Interruption of laser irradiation | | |
| | | Misalignment | | Displacement | | |
| | | Insufficient penetration | | Lens stain | | |
| | Inner diameter | Rattling | | Wear of cutter | | |
| | | | | Measurement error | | |
| | Outer diameter | Not insertable | | Wear of cutter | | |
| | | | | Measurement error | | |

T22 (T22-1, T22-2, T22-3)

Relations: R1, R2, R3, R4, R5, R6

[FIG. 10]

[FIG. 11]
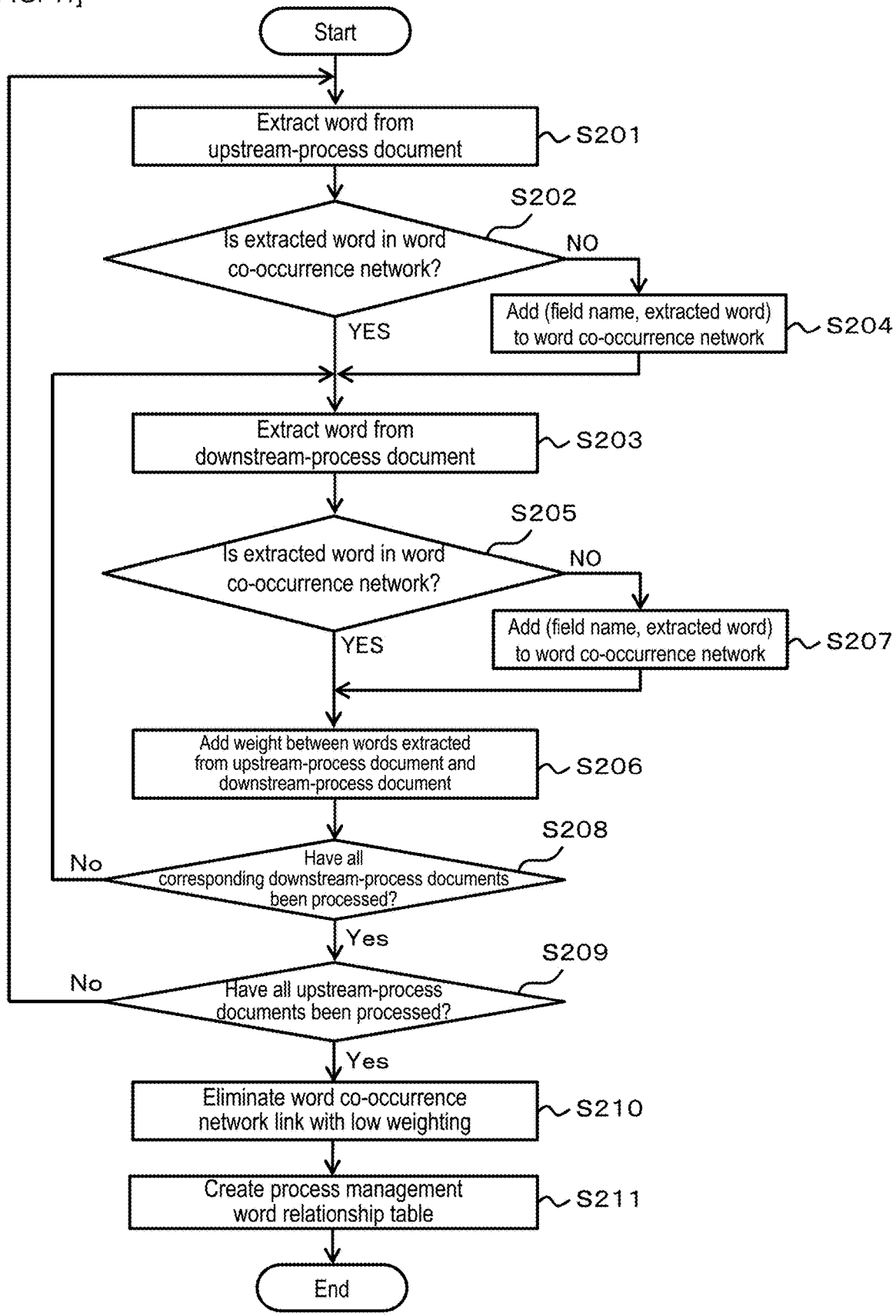

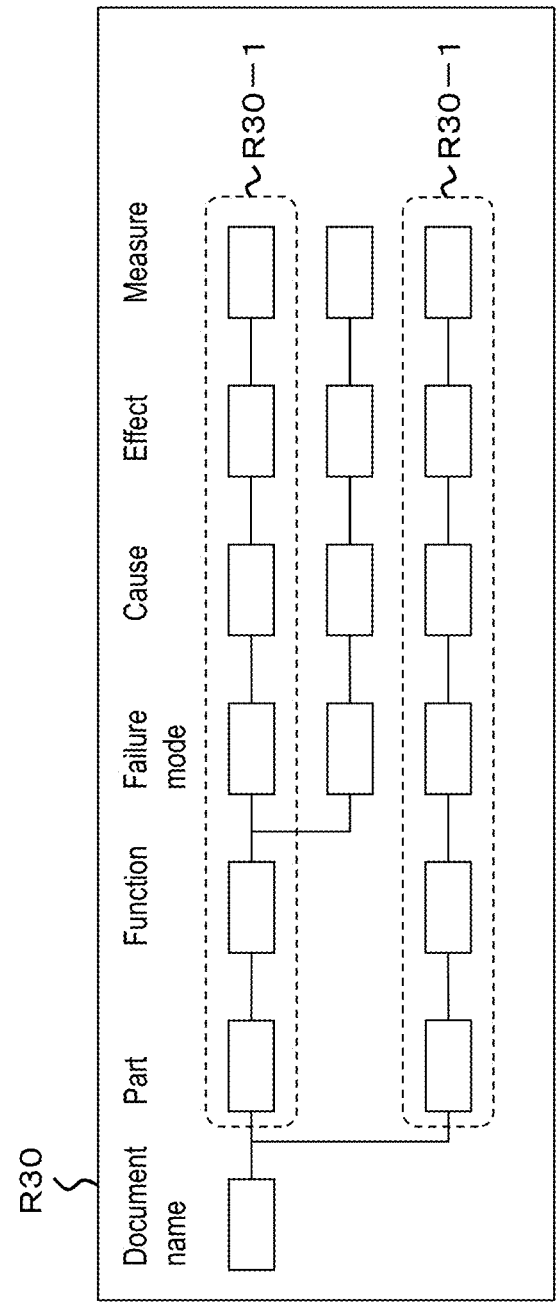
[FIG. 12]

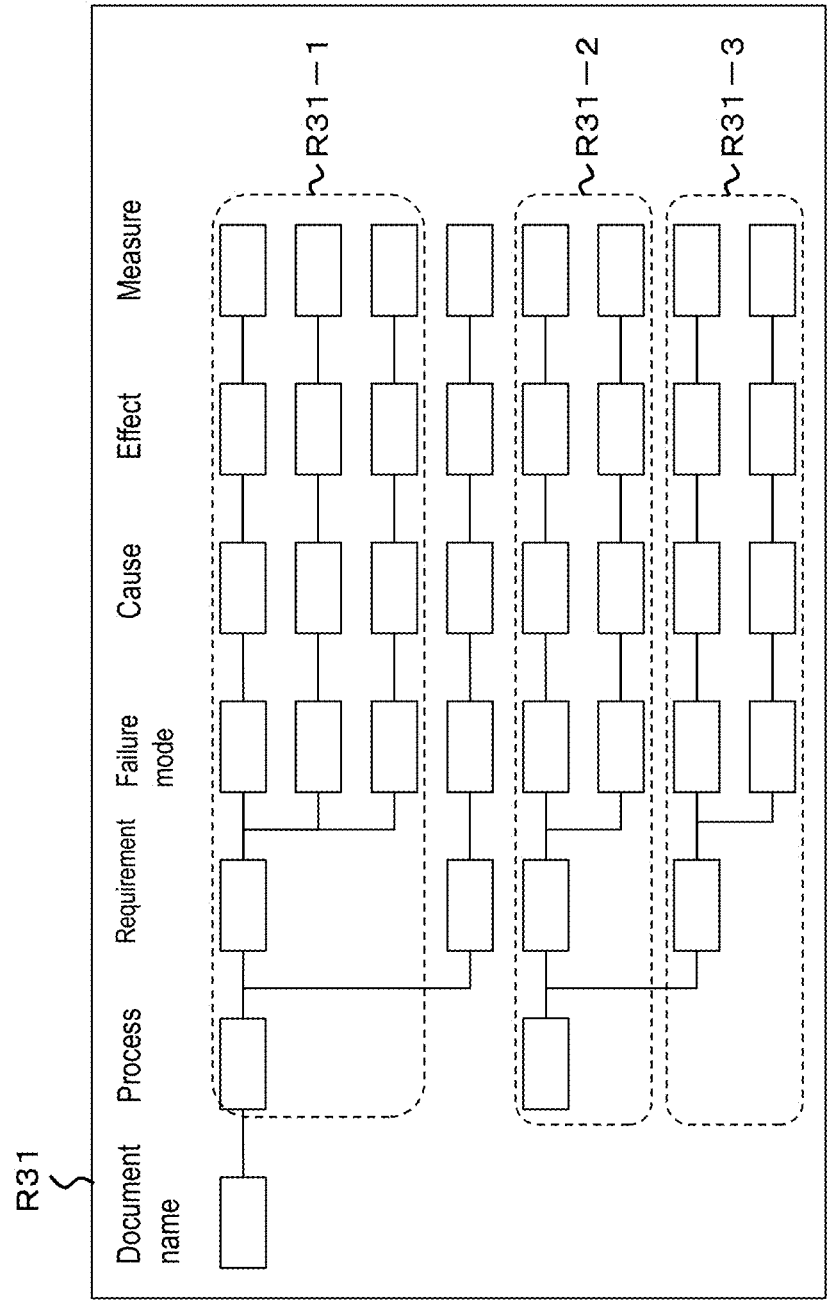
[FIG. 13]

[FIG. 14]
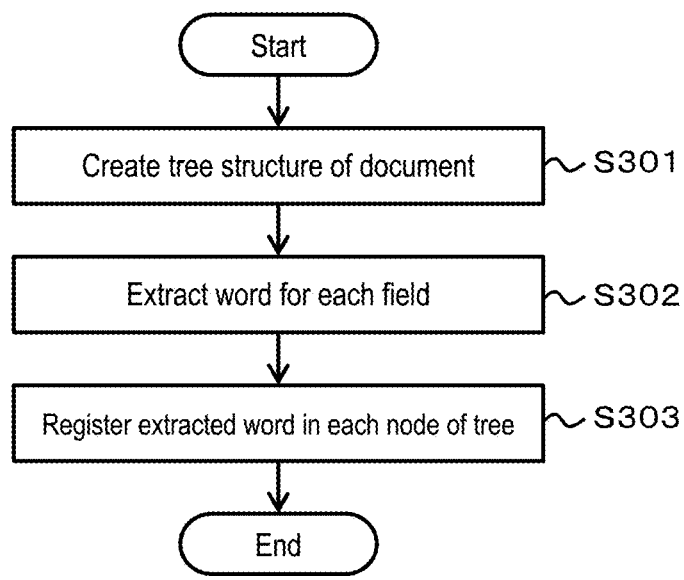

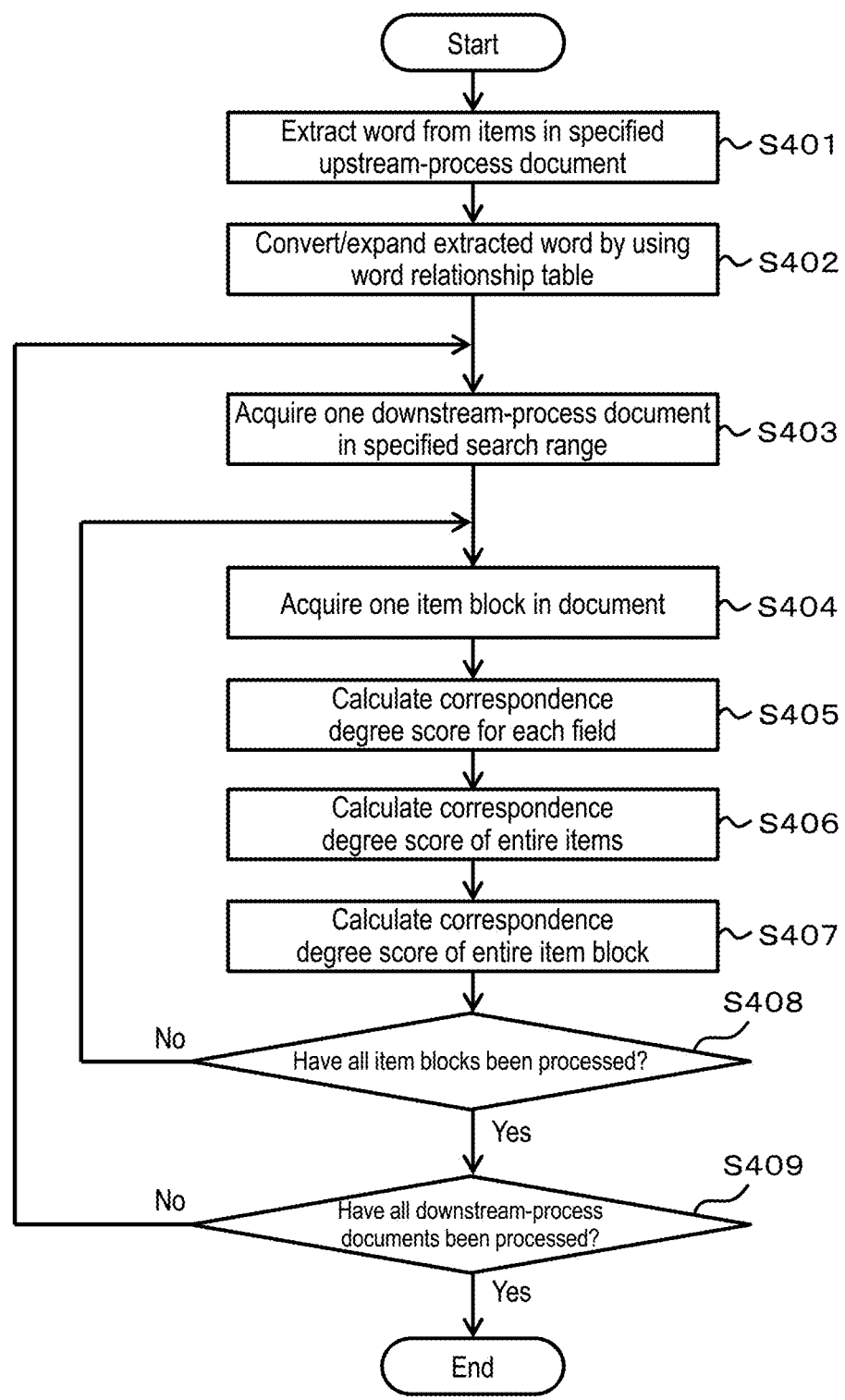
[FIG. 15]

[FIG. 16]

| Item ID of upstream-process document | ID of corresponding downstream-process document | Item block ID | Item ID |
|---|---|---|---|
| 1 | T21 | 3 | 5 |
|  |  |  | 6 |
|  | T21 | 10 | 52 |
| 2 | T21 | 105 | 436 |
|  | T21 | 6 | 22 |
|  |  |  | 24 |
| ⋮ | ⋮ | ⋮ | ⋮ |

| Item block ID of downstream-process document | ID of corresponding upstream-process document | Item ID |
|---|---|---|
| 1 | T11 | 55 |
| ⋮ | ⋮ | ⋮ |
| 3 | T11 | 1 |
| ⋮ | ⋮ | ⋮ |

| Item ID of downstream-process document | ID of corresponding upstream-process document | Item ID |
|---|---|---|
| 1 | T11 | 55 |
| : | : | : |
| 5 | T11 | 1 |
| : | : | : |

[FIG. 19]
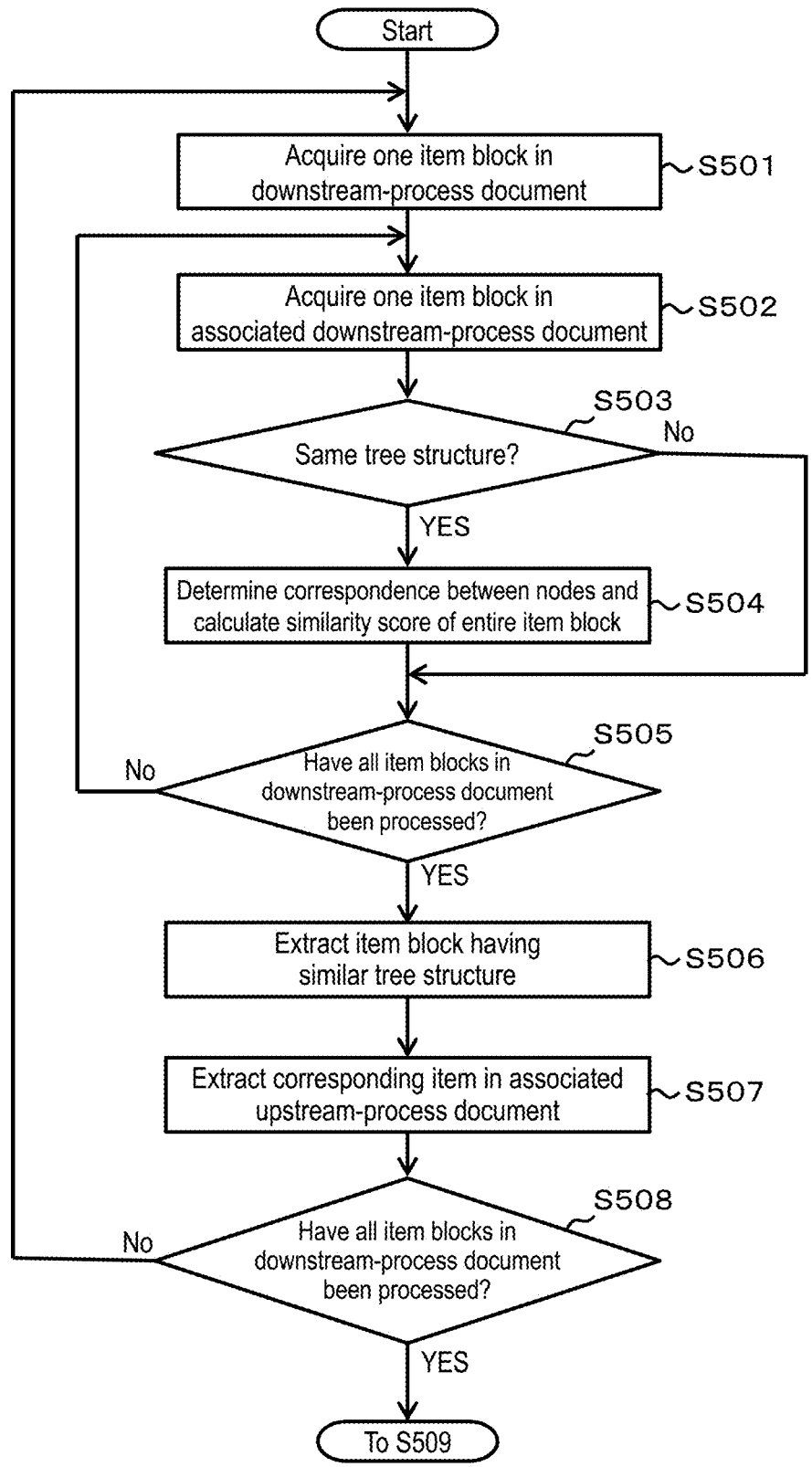

[FIG. 20]
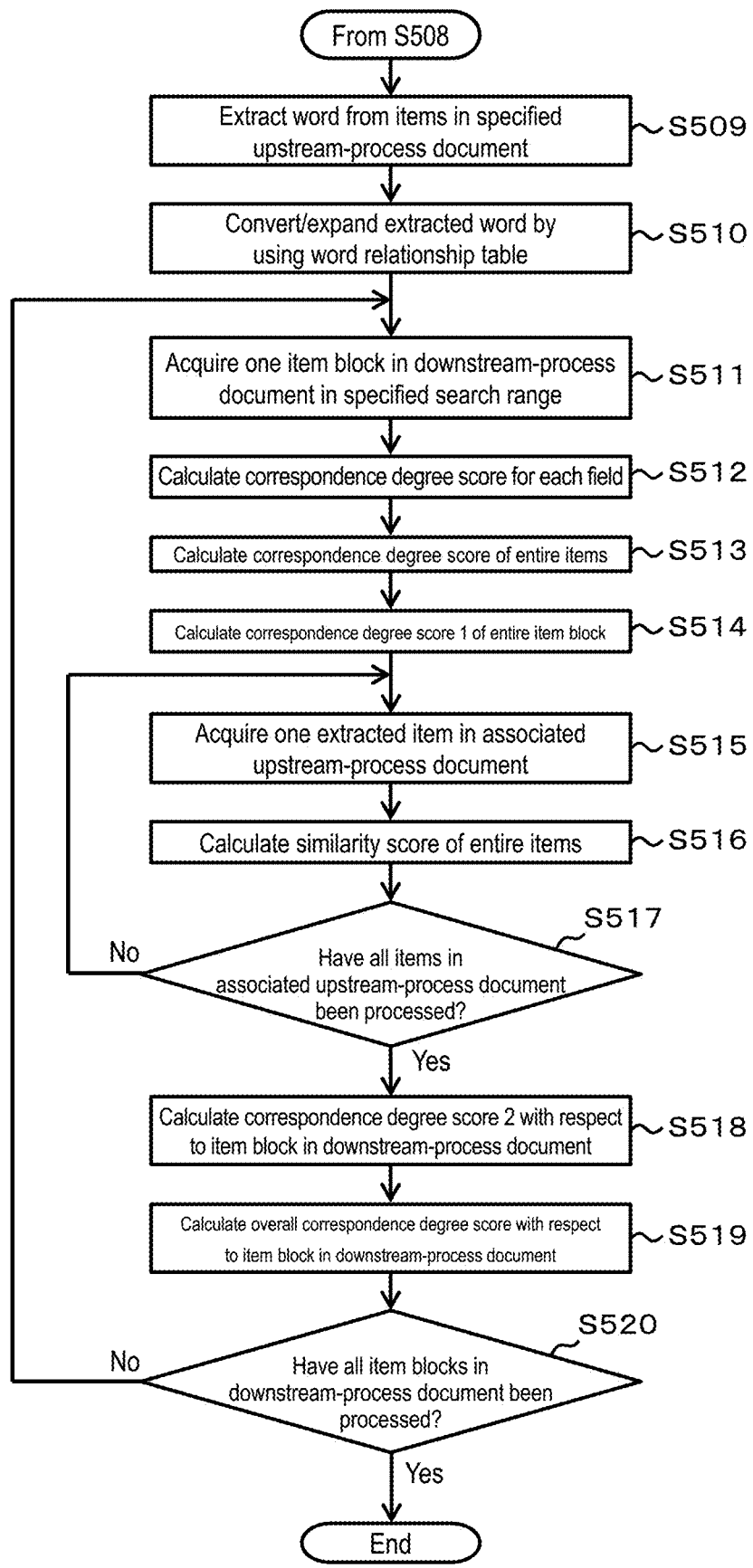

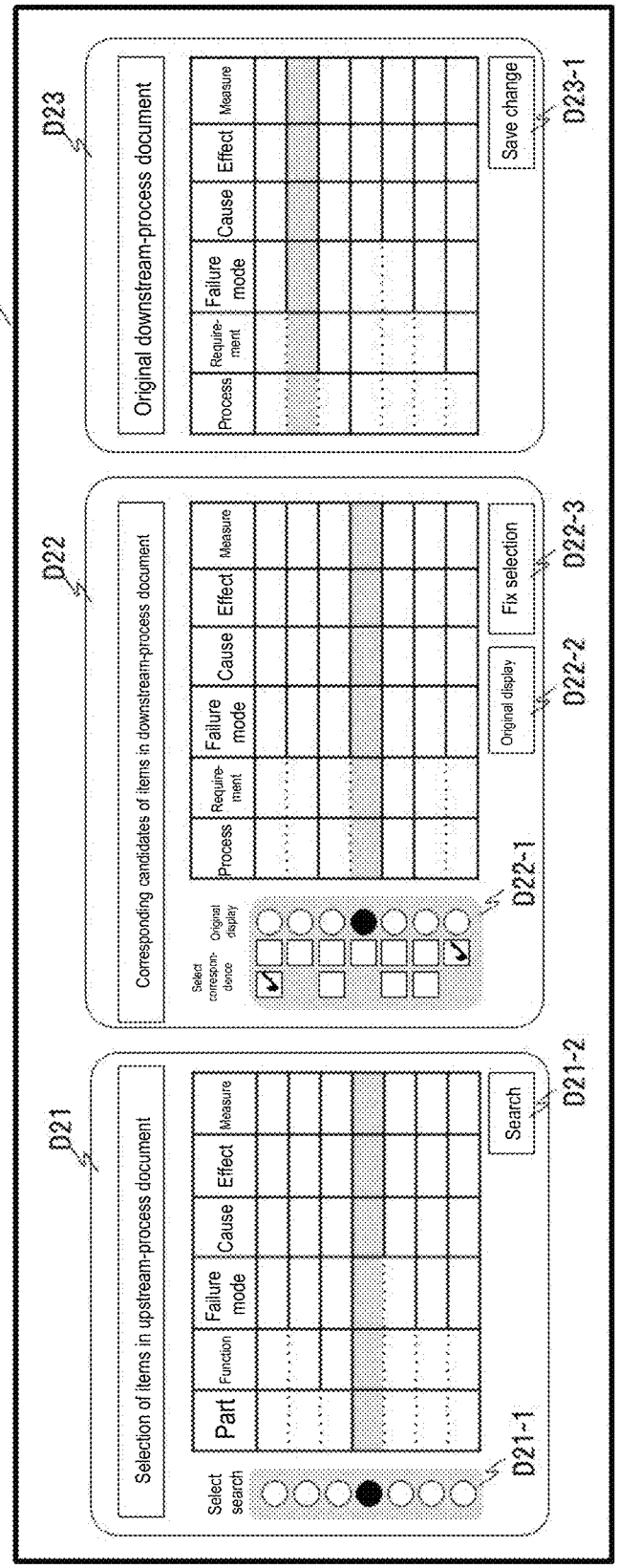
[FIG. 21]

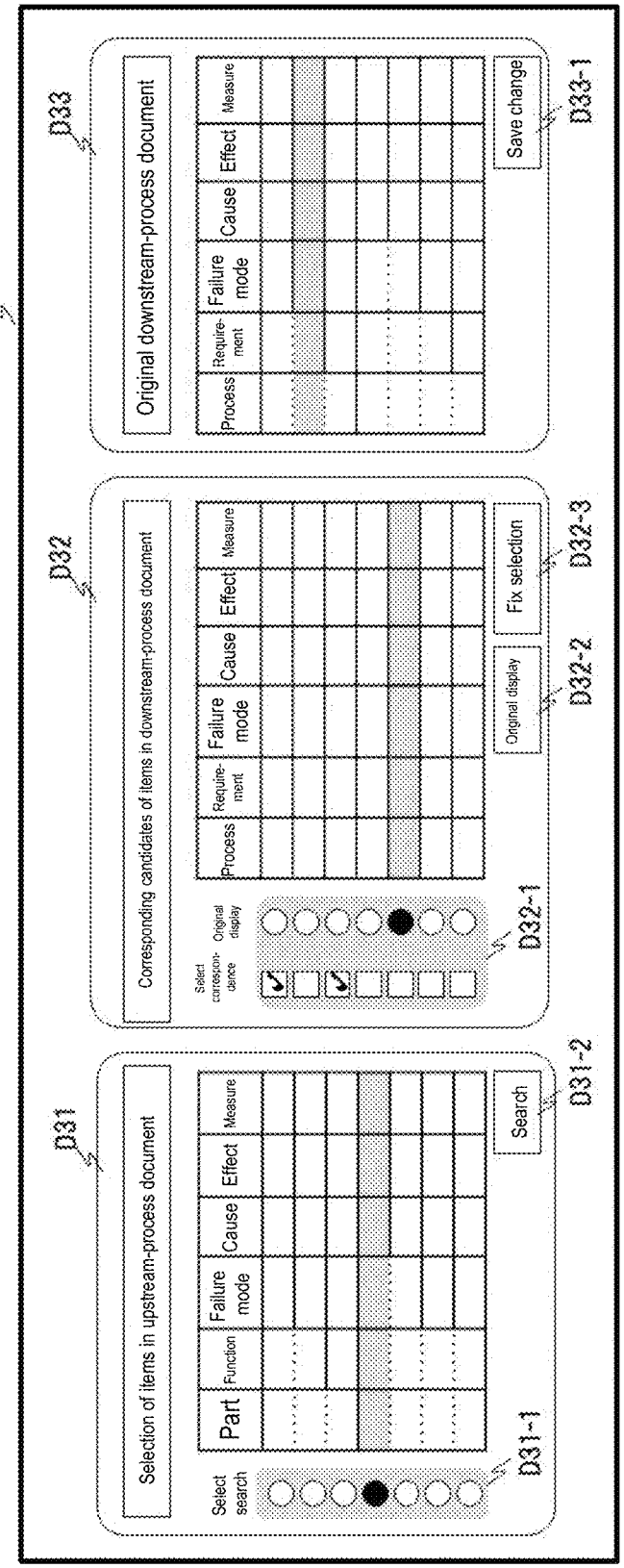
[FIG. 22]

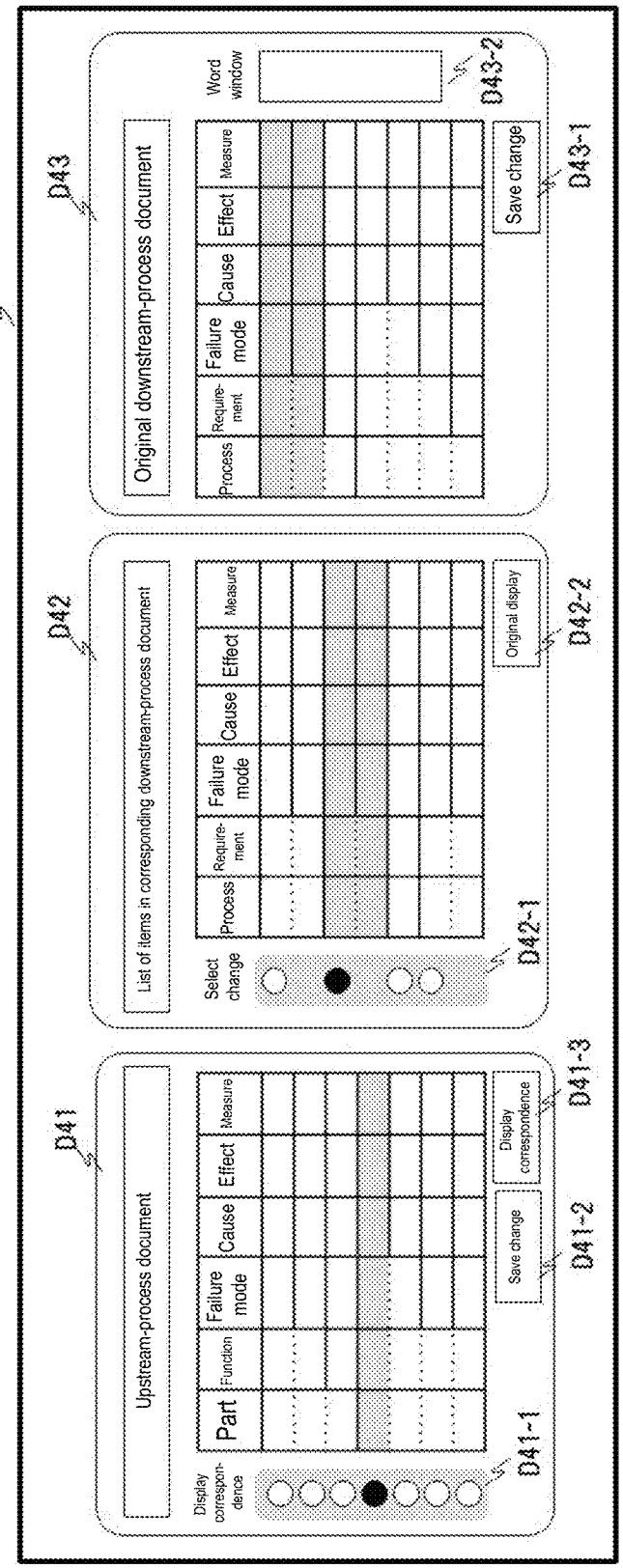
[FIG. 23]

INFORMATIONIMAGE PROCESSING SYSTEM AND INFORMATIONIMAGE PROCESSING METHOD

BACKGROUND

The present invention relates to an information processing system and an information processing method.

In the manufacturing industries, various documents are created so as to prevent generation of a defective product. In the process of creating these documents, for example, it is necessary to fully describe a cause of a defect and a measure against the defect which are common in each of a document created in an upstream process such as a design section (hereinafter referred to as an upstream process) and a document created in a downstream process such as a production engineering section or a manufacturing section (hereinafter referred to as a downstream process).

Therefore, for example, Japanese Patent Laid-Open No. 2016-42214 discloses a design support system for creating a document while adding relevance among items in each of the document created in the upstream process such as the design section and the document created in the downstream process such as the production engineering section or the manufacturing section.

In the design support system disclosed in Japanese Patent Laid-Open No. 2016-42214, there is added a correspondence relation between each item in the document created in the upstream process and each item in the document created in the downstream process. Hence in this design support system, for example in a case where a part of the process is changed due to a minor change in product or some other case, a content due to a change in part of the process can be fully described in each of the documents.

SUMMARY

However, in the design support system disclosed in the Japanese Patent Laid-Open No. 2016-42214, although it is possible to add a correspondence relation between each item in a newly created document in the upstream process and each item in a newly created document in the downstream process, it is not possible to add a correspondence relation between items in existing documents to which no correspondence relation has been added.

Therefore, the present invention has been made by focusing attention on the above problem, and it is an object of the present invention to appropriately add a correspondence relation between items in multiple documents.

In order to solve the above problem, there is provided an information processing system including: a document data reception unit configured to receive multiple pieces of document data; a document data storage unit configured to store the received multiple pieces of document data; and a correspondence relation estimation unit configured to estimate a correspondence relation at least between an item in a first document data and an item in a second document data out of the multiple pieces of document data stored in the document data storage unit, the correspondence relation estimation unit including an item-item coupling relation extraction unit configured to extract a coupling relation among items in the first document data and a coupling relation among items in the second document data, and a word relationship extraction unit configured to extract a relevance between a word that appears in an item in the first document data and a word that appears in an item in the second document data.

According to the present invention, it is possible to appropriately add a correspondence relation of each item between multiple documents.

BRIEF DESCRIPTION OF THE DRAWINGS

FIG. 1 is a diagram illustrating an example of a design FMEA used in an upstream process;

FIG. 2 is a diagram illustrating an example of a process FMEA used in a downstream process;

FIG. 3 is a diagram illustrating an example of a tree structure of a parts list used in the upstream process;

FIG. 4 is a diagram illustrating an example of a tree structure of a parts list used in the downstream process;

FIG. 5 is a functional block diagram of an information processing system according to an embodiment of the present invention;

FIG. 6 is a flowchart of word relationship extraction processing in a word relationship extraction unit;

FIG. 7 is a diagram illustrating an example of a part name-word relationship table;

FIG. 8 is an example showing an extraction result for a word relationship displayed on a display apparatus;

FIG. 9 is a diagram schematically representing document data, to which a correspondence relation between a design FMEA (document data in the upstream process) and a process FMEA (document data in the downstream process) is added;

FIG. 10 is a diagram illustrating an example of a process management-word relationship table;

FIG. 11 is flowchart of word relationship extraction processing in the word relationship extraction unit;

FIG. 12 is a diagram illustrating an example of an item-item coupling relationship table;

FIG. 13 is a diagram illustrating an example of the item-item coupling relationship table;

FIG. 14 is a flowchart of item-item coupling relation extraction processing in the item-item coupling relation extraction unit;

FIG. 15 is a flowchart of item-item correspondence degree calculation processing;

FIG. 16 is a diagram illustrating an example of an item-item correspondence relation table;

FIG. 17 is a diagram illustrating an example of the item-item correspondence relation table;

FIG. 18 is a diagram illustrating an example of the item-item correspondence relation table;

FIG. 19 is a flowchart of another item-item correspondence degree calculation processing in an item-item correspondence degree calculation unit 33;

FIG. 20 is a flowchart of another item-item correspondence degree calculation processing in the item-item correspondence degree calculation unit 33;

FIG. 21 is a diagram illustrating an example of a support screen for addition of an item-item correspondence relation and missing/omission checking;

FIG. 22 is a diagram illustrating another example of the support screen for addition of the item-item correspondence relation and missing/omission checking; and FIG. 23 is a diagram illustrating an example of the document change support screen.

DETAILED DESCRIPTION OF THE EMBODIMENT

Hereinafter, an information processing system 1 according to an embodiment of the present invention will be described.

In the embodiment, a description will be given of a case where the correspondence relation between an item in a document created by a design section (hereinafter referred to as an upstream-process document or a design document) and an item in a document created by a production engineering section or a manufacturing section (hereinafter referred to as a downstream-process document or a production/engineering document) is given by the information processing system 1. Further, a description will be given of a case where the information processing system 1 is used to check whether or not contents described in the design document are fully described in the production/engineering document.

In the following description, the design section is referred to as an upstream process, and the production engineering section and the manufacturing section are referred to as a downstream process.

FIG. 1 is a diagram illustrating an example of a design FMEA T10 used in the upstream process.

FIG. 2 is a diagram illustrating an example of a process FMEA T20 used in the downstream process.

FIG. 3 is a diagram illustrating an example of a tree structure of a parts list T30 used in the upstream process.

FIG. 4 is a diagram illustrating an example of a tree structure of a parts list T40 used in the downstream process.

Design FMEA

T10 of FIG. 1 is an example of a design Failure Mode and Effect Analysis (FMEA) created in the upstream process such as the design section. The present document will be used as an example of the design document data created in the upstream process.

As shown in FIG. 1, a function, a failure mode, a cause, an effect, a measure, and the like are described for each part in the design FMEA T10. This diagram is a simplified diagram, and the embodiment is not limited to this example.

Hereinafter, in the document (design FMEA T10, process FMEA T20), a vertical column is referred to as a field and a horizontal row is referred to as an item.

In the figure, T10-1 (a dotted line in FIG. 1) is an example showing one item. The contents of description in each item of the design FMEA T10 are divided into more detailed contents as going from the left field to the right field. When each field in each item is taken as one node, the structure of the design document data is a tree structure. In the embodiment, multiple items constituting the tree structure are referred to as an item block. T10-2 (a dotted line in FIG. 1) is an example showing an item block for each function.

Process FMEA

Next, T20 of FIG. 2 is an example of a process Failure Mode and Effect Analysis (FMEA) created in the downstream process such as the production engineering section. This document will be used as an example of the production/engineering document data created in the downstream process.

As shown in FIG. 2, a requirement, a failure mode, a cause, an effect, a measure, and the like are described for each manufacturing process in the process FMEA T20. This diagram is a simplified diagram, and the embodiment is not limited to this example.

In the process FMEA T20, the definitions of the field, the item, and the item block are the same as in the design FMEA T10. T20-1 (a dotted line in the figure) is an example showing one item, and T20-2 (a dotted line in the figure) is an example showing an item block for each requirement.

In the item of the design FMEA T10 shown in FIG. 1, a measure concerning a certain failure mode in the design process or the manufacturing process is described. One measure is often associated with one requirement to be achieved in the process FMEA T20. Hence, the embodiment shows the example of estimating and presenting the correspondence relation of the item block (T20-2 of FIG. 2) for each requirement in the process FMEA T20 with respect to one item in the design FMEA T10 (T10-1 of FIG. 1). However, the embodiment is not limited thereto.

Parts List

Each of T30 (parts list T30) shown in FIG. 3 and T31 (parts list T31) shown in FIG. 4 is an example where each parts list is represented by the tree structure. The parts list is a type of document. In the parts list T30, symbol a denotes an assy name, and symbols b and f denote sub-assy names. Symbols c, d, e, g, h, i, and j in the parts list T30 denote individual part name constituting the sub-assies. In the parts list T30 shown in FIG. 3, the sub-assies T30-1 (b, c, d, e), T30-2 (g, h, i, j) are surrounded by dotted lines.

In the above parts list T30 and the parts list T31 respectively created in the design section and in the production engineering section or the like, some part names are often different due to a difference in section or person having created the list, while all part names may be the same in some cases.

Meanwhile, with the parts lists T30, T31 representing the parts of the same product, the tree structure in the parts list T30 (see FIG. 3) and the tree structure of the parts list T31 (see FIG. 4) are the same. Here, the tree structure shows the coupling relation among parts described in each parts list.

Information Processing System

Next, the information processing system 1 according to the embodiment of the present invention will be described.

FIG. 5 is a functional block diagram of the information processing system 1 according to the embodiment of the present invention.

As shown in FIG. 5, the information processing system 1 includes a document reception unit 10, a data storage unit 20, a correspondence relation estimation unit 30, a data update unit 40, a user's instruction reception unit 50, and a data presentation unit 60.

Document Reception Unit

The document reception unit 10 is coupled to a document acquisition unit 100 or the like through a network connection (not shown), and receives a document stored in the document acquisition unit 100 and transmitted from each section (e.g., the design FMEA T10 and the process FMEA T20 described above).

The document acquisition unit 100 is coupled to a terminal device (not shown) in each section through the network connection (not shown), and acquires a document created in each section via this terminal device.

The document reception unit 10 is coupled to the data storage unit 20 and transmits to the data storage unit each document acquired from the document acquisition unit 100.

Here, the document stored in the document acquisition unit 100 includes the design FMEA T10, the process FMEA T20, the parts list T30 created in the design section, and the parts list T31 created in the production engineering section or the like, which are described above.

Data Storage Unit

The data storage unit 20 includes a document database 21, an item-item correspondence relation database 22, a word relationship database 23, and an item-item coupling relation database 24.

The document database 21 stores each document transmitted from the document reception unit 10.

The item-item correspondence relation database 22, the word relationship database 23 and the item-item coupling relation database 24 store the correspondence relation among items in documents.

Here, in a state before the information processing system 1 according to the present embodiment forming the correspondence relation among items in documents (an initial operation state), nothing is stored in the item-item correspondence relation database 22, the word relationship database 23, or the item-item coupling relation database 24. As the association among items in each document proceeds by the information processing system 1, a predetermined correspondence relation is stored in each of the databases 22 to 24.

User's Instruction Reception Unit

The use's instruction reception unit 50 is connected to a user terminal 200 through the network connection (not shown). A user (not shown) inputs a predetermined document name (e.g., names of the design FMEA and the process FMEA to be associated; and may hereinafter be simply referred to as a document name) with an input apparatus 210 of the user terminal 200, and this predetermined document name is transmitted to the user's instruction reception unit 50.

Based on the document name transmitted from the user terminal 200, the user's instruction reception unit 50 searches document data with the same document name (the design FMEA, the process FMEA) from the document database 21 of the data storage unit 20. The user's instruction reception unit 50 transmits the searched document data to the data presentation unit 60.

Data Presentation Unit

The data presentation unit 60 transmits the document data to a display apparatus 220 of the user terminal 200. The document data (the design FMEA, the process FMEA) corresponding to the document name inputted by the user is displayed on the display apparatus 220 of the user terminal 200. Thus, when one piece of document data is displayed on the display apparatus 220, the user can promptly check as to whether or not the document data is data to be acquired. When multiple pieces of document data (the design FMEA, the process FMEA) are displayed on the display apparatus 220, the user can select the most appropriate document data (design FMEA, process FMEA) out of those and select one item in the document data as a searched sentence item.

Further, the user's instruction reception unit 50 transmits one item in the document data (the design FMEA, the process FMEA), selected by the user, to the correspondence relation estimation unit 30.

Correspondence Relation Estimation Unit

The correspondence relation estimation unit 30 includes a word relationship extraction unit 31, an item-item coupling relation extraction unit 32, and an item-item correspondence degree calculation unit 33.

The word relationship extraction unit 31 acquires a name of the product in the parts list T30 corresponding to the design FMEA which is inputted by the user and a name of the product in the parts list T31 corresponding to the process FMEA, via the user's instruction reception unit 50, and calls pieces of data in the parts lists T30, T31, acquired from the document database 21.

The word relationship extraction unit 31 extracts the relationship between part name words based on the called pieces of data in the parts lists T30, T31. The relationship extracted by the word relationship extraction unit 31 is stored in the word relationship database 23 of the data storage unit 20.

The item-item coupling relation extraction unit 32 extracts the coupling relation between the item in the design FMEA inputted by the user and the corresponding item in the process FMEA. The coupling relation between the items extracted by the item-item coupling relation extraction unit 32 is stored in the item-item coupling relation database 24 of the data storage unit 20.

The item-item correspondence degree calculation unit 33 acquires the document data (the design FMEA), selected by the user from the document database 21, the item-item correspondence relation data stored in the item-item correspondence relation database 22, the word relationship data stored in the word relationship database, and the item-item correspondence relation data stored in the item-item coupling relation database 24, and calculates a correspondence degree in each item in the corresponding document data (process FMEA).

The item-item correspondence degree calculation unit 33 sorts the items with the calculated correspondence degree score in the descending order of the correspondence degree scores, and thereafter transmits the sorted items to the data presentation unit 60.

Data Presentation Unit

The data presentation unit 60 transmits, to the display apparatus 220 of the user terminal 200, the items sorted in the descending order of the correspondence degree scores.

Therefore, the user selects a truly corresponding item out of items displayed on the display apparatus 220 by using the input apparatus 210. Hence, the truly corresponding item, selected by the input apparatus 210, is transmitted to the user's instruction reception unit 50.

The user's instruction reception unit 50 transmits to the data update unit 40 the truly corresponding item received from the input apparatus 210.

Data Update Unit

The data update unit 40 stores the truly corresponding item selected by the user into the item-item correspondence relation database 22 and updates the item.

The correspondence relation is thus added between the items in the design FMEA and the process FMEA.

Word Relationship Extraction Processing

Next, processing in the word relationship extraction unit 31 of the correspondence relation estimation unit 30 will be described.

FIG. 6 is a flowchart of the word relationship extraction processing in the word relationship extraction unit 31.

In the embodiment, as an example of word relationship extraction, a description will be given of a case of two kinds of extraction: (1) extraction of the relationship between part name words in the parts lists T30-1, T30-2; and (2) extraction of relationship of process management words.

First, the extraction processing for the relationship between part name words in the parts lists (1) will be described.

As shown in FIG. 6, in Step S101, the tree structure of each parts list to be a comparison target is created.

Using the example of the parts list T30 shown in FIG. 3 for description, the word relationship extraction unit 31 creates a tree structure representing the coupling relation among the parts in the parts list T30 by adding a node number (hereinafter also referred to as a node ID) to each of the part names a, b, c, d, e, f, g, h, i, and j which constitute a predetermined product a and analyzing in which tier of the tree structure each node ID is located, how many couplings (links) to other node IDs are in the lower layer of each node ID, and which node ID is in the lower layer of which node ID.

As shown in FIG. 3, in the embodiment, the product (also referred to as assembly or assy) a is made up of two sub-assemblies (each of which is also referred to as sub-assy) b(T30-1), f(T30-2).

The sub-assy T30-1 is made up of the parts b, c, d, e, the part c and the part d are coupled to the lower layer of the part b, and the part e is further coupled to the lower layer of the part d.

The sub-assy T30-2 is made up of the parts f, g, h, i, j, the part g and the part j are coupled to the lower layer of the part f, and the part j is further coupled to the lower layer of the part i.

Also in the parts list T31 shown in FIG. 4, similarly to the parts list T30, a tree structure representing the coupling relation among the parts in the parts list T31 is created by adding a node ID to each of the part names k, l, m, n, o, p, q, r, s, t, which constitute a predetermined product (assy) k and analyzing in which tier of the tree structure each node ID is located, how many couplings (links) to other node IDs are in the lower layer of each node ID, and which node ID is in the lower layer of which node ID, similarly to the parts list T30.

As shown in FIG. 4, in the embodiment, the product (assy) is made up of two sub-assies l(T31-1) and p(T31-2).

The sub-assy T31-1 is made up of the parts l, m, n, o, the part m and the part n are coupled to the lower layer of the part l, and the part o is further coupled to the lower layer of the part n.

The sub-assy T31-2 is made up of the parts p, q, r, s, the part q and the part s are coupled to the lower layer of the part p, the part r is further coupled to the lower layer of the part q, and the part t is further coupled to the lower layer of the part s.

In Step S102, the word relationship extraction unit 31 acquires one sub-assy in the tree structure of the parts list T30 (a first parts list) created in Step S101. In the embodiment, first, the word relationship extraction unit 31 acquires the sub-assy T30-1 in the parts list T30.

In Step S103, the word relationship extraction unit 31 acquires one sub-assy in the tree structure of the parts list T31 (a second parts list) created in Step S101. In the embodiment, first, the word relationship extraction unit 31 acquires the sub-assy 31-1 in the parts list T31.

Next, in Step S104, the word relationship extraction unit 31 compares the sub-assy T30-1 in the parts list T30 and the sub-assy 31-1 in the parts list T31. The word relationship extraction unit 31 compares the number of tiers in each sub-assy, the number of nodes in each tier, and the number of nodes located in the lower layer of each node in each tier in this order to determine whether or not the tree structures are the same. That is, the word relationship extraction unit 31 makes comparison as to whether or not the tree structures of the sub-assy T30-1 and the sub-assy 31-1 are the same and determines whether or not the tree structures of the respective sub-assies are the same.

In Step S104, when determining that the tree structures of the sub-assy T30-1 in the parts list T30 and the sub-assy 31-1 in the parts list T31 are the same (Step S104: Yes), the word relationship extraction unit 31 goes to Step S105, and when determining that the tree structure are not the same (Step S104: No), the word relationship extraction unit 31 moves the processing to Step S108.

In Step S105, the word relationship extraction unit 31 determines the correspondence relation between the nodes (parts) in the sub-assies 30-1, 31-1 based on the created tree structures of the sub-assies T30-1, 31-1. In the embodiment, the sub-assy T30-1 in the parts list T30 and the sub-assy 31-1 in the parts list T31 have the same tree structure (the shapes of the tree structures match), so that the correspondence relation between the nodes (parts) in the sub-assies 30-1, 31-1 can be determined uniquely.

Specifically, with the sub-assy T30-1 and the sub-assy 31-1 having the same tree structures, the part (node) b in the sub-assy T30-1 corresponds to the part l in the sub-assy 31-1, and in the same manner, the parts c, d, e in the sub-assy T30-1 respectively correspond to the parts m, n, o in the sub-assy 31-1.

In Step S106, the word relationship extraction unit 31 calculates the similarity of the words of the nodes (parts) associated in Step S105. In the embodiment, the similarity of the word is calculated between each of the part names of the parts b, c, d, e constituting the sub-assy T30-1 and each of the part names of the parts l, m, n, o constituting the sub-assy 31-1. For this calculation of the similarity of the part names, an analysis method such as N-gram can be used.

In Step S107, the word relationship extraction unit 31 sums up the similarities of the words in the respective nodes (parts) calculated in the step S106 and divides the total by the number of nodes (the number of parts) in the sub-assy (T30-1 or T31-1), to calculate the similarity between the entire sub-assy T30-1 and the entire sub-assy 31-1.

In Step S108, the word relationship extraction unit 31 determines whether or not all the sub-assies (T31-1, T31-2) in the parts list T31 have been compared with one sub-assy T30-1 in the parts list T30.

When determining that all the sub-assies (T31-1, T31-2) in the parts list T31 (the second parts list) have been compared with one sub-assy T30-1 in the parts list T30 (the first parts list) (Step S108: Yes), the word relationship extraction unit 31 goes to Step S109, and when determining that all the sub-assies have not been compared (Step S108: No), the word relationship extraction unit 31 returns to Step S103.

When determining that the sub-assy T30-1 of the parts list T30 (the first parts list) and all the sub-assies (T31-1, T31-2) of the parts list T31 (the second parts list) have not been compared (Step S108: No), the word relationship extraction unit 31 returns to Step S103 to acquire another sub-assy T31-2 in the parts list T31 (the second parts list), and repeats the processing from Step S103 to Step S108 until determining that all the sub-assies (T31-1, T31-2) in the parts list T31 (the second parts list) have been compared with one sub-assy T30-1 in the parts list T30 (the first parts list).

In Step S109, the word relationship extraction unit 31 determines whether or not all the sub-assies in the parts list T30 (the first parts list) have been compared with the sub-assies in the parts list T31 (the second parts list). When determining that all the sub-assies in the parts list T30 have been compared (Step S109: Yes), the word relationship extraction unit 31 goes to Step S110, and when determining that all the sub-assies have not been compared (Step S109: No), the word relationship extraction unit 31 returns to Step S102 and repeats the processing from Step S102 to Step S109 until determining that all the sub-assies in the parts list T30 (the first parts list) and the sub-assies in the parts list T31 (the second parts list) have been compared.

In Step S110, the word relationship extraction unit 31 determines candidates for a node (part) corresponding in the parts list T30 and the parts list T31.

Specifically, as for the sub-assy T30-1 in the parts list T30 and the sub-assy 31-1 in the parts list T31, the corresponding node candidates have already been determined uniquely.

Meanwhile, as for the sub-assy T 30-2 in the parts list T30 and the sub-assy T31-2 in the parts list T31, two patterns of the corresponding node candidates are considered: the nodes g, h in the sub-assy T30-2 with respect to the nodes q, r or the nodes s, t in the sub-assy 31-2; and the corresponding node candidates are the nodes i, j in the sub-assy T30-2 with respect to the nodes q, r or the nodes s, t in the sub-assy 31-2. In this case, the word relationship extraction unit 31 can accurately determine a pattern with the highest similarity of the entire sub-assy calculated in Step S107 as the corresponding node candidate.

When multiple sub-assies having the same tree structures are in the parts list T30 (the first parts list) and the parts list T31 (the second parts list) as above, in Step S110, the word relationship extraction unit 31 selects a sub-assy having the highest similarity out of the sub-assies, to determine the corresponding node candidate in the sub-assy.

In the embodiment, the comparison has been made for each sub-assy in the second layer (T30-1, T30-2, or T31-1, T31-2), but the embodiment is not limited thereto.

Part Name-Word Relationship Table

Next, a description will given of an example of the part name-word relationship table, created by the word relationship extraction processing (Steps S101 to S110 in FIG. 6) in the word relationship extraction unit 31 described above.

FIG. 7 is a diagram illustrating an example of a part name-word relationship table R10.

As shown in FIG. 7, in the part name-word relationship table R10, nodes (parts) in the parts list T30 are associated with nodes (parts) in the parts list T31 having the highest relationship (the highest similarity) as a result of the word relationship extraction processing (Step S101 to Step S110).

In the embodiment, as a result of calculating the similarity of the part name word (hereinafter also referred to as a node word), the nodes (parts) g, h in the parts list T30 are determined to respectively correspond to the nodes (parts) s, t in the parts list T31 and associated in the part name-word relationship table R10.

This part name-word relationship table R10 is stored in the word relationship database 23.

The word relationship extraction unit 31 presents an extraction result for the relationship between the part name words (see FIG. 8) to the user via the data presentation unit 60. The user confirms the extraction result for the word relationship, displayed on the display apparatus 220 via the data presentation unit 60, and instructs the user's instruction reception unit 50 to make approval when the extraction result is correct, or make correction when there is an error in the extraction result.

FIG. 8 is an example showing the extraction result for the word relationship displayed on the display apparatus 220.

As shown in FIG. 8, on the screen D10 of the display apparatus 220, an overall tree structure D11 of the parts list T30 is displayed on the left side and an overall tree structure D12 of the parts list T31 is displayed on the right side. On the rightmost side of the screen D10, a button group D13 to be operated by the user is displayed.

For example, when the user clicks a node (part) f in the tree structure D11 of the parts list T30, the entire sub-assy T30-2 including the node f is highlighted, and relationships D14, D15 of the sub-assy 31-2 in the parts list T31 which corresponds to the sub-assy T30-2 are displayed.

When the relationships D14, D15 displayed on the screen D10 are correct, the user presses an approval button in the button group D13. On the other hand, when the relationships D14, D15 are to be corrected, the user clicks D14 and D15, changes the coupling destinations to correct nodes, and presses a correction button in the button group D13. When a full display button in the button group D13 is pressed, all the coupling relations are displayed. At this time, when there is an error such as coupling of multiple nodes to one node, correction is made again and a total approval button in the button group D13 is pressed to fix the coupling relation.

FIG. 8 described above is an example showing the extraction result for the relationship between the part name words displayed on the display apparatus 220, and the embodiment of each of the display, approval, and correcting methods is not restricted to this example.

When detecting that the approval button or the total approval button in the button group D13 has been pressed by the user, the user's instruction reception unit 50 transmits the fixed coupling information to the data update unit 40, and when there is a correction, the data update unit 40 updates the contents of the word relationship database 23.

Next, a description will be given of a process management-word relationship extraction processing of (2).

FIG. 9 is a diagram schematically representing document data, to which a correspondence relation between a design FMEA (T10, T11) and a process FMEA (T20, T21) is added.

As shown in FIG. 9, the design FMEA T11 and the design FMEA T12 represent different design FMEA, and the process FMEA T21 and the process FMEA T22 are different process FMEAs. In the figure, T11-1, T11-2, T12-1, and T12-2 represent items in the design FMEA, and T21-1, T21-2, T21-3, T22-1, T22-2, and T22-3 represent item blocks concerning requirements in the process FMEA. R1, R2, R3, R4, R5, and R6 are correspondence relations between the items in the design FMEA and the item blocks in the process FMEA. In reality, sentences are put down in each of the fields of the design FMEA T11, T12 and the process FMEA T21, T22, but in the embodiment, only necessary fields are made displayed.

The design FMEA T11, T12 and the process FMEAs T21, T22 described above are stored in the document database 21, and the item-item correspondence relations R1, R2, R3, R4, R5, R6 are stored in the item-item correspondence relation database 22. An example of storage in the item-item correspondence relation database 22 will be described later. In the embodiment, the correspondence relations are added between the items in the design FMEA T11, T12 and the item blocks in the process FMEA T21, T22, but the embodiment is not limited thereto.

Process Management-Word Relationship Table

Here, a description will be given of an example of a process management-word relationship table R20, having been extracted by using the document data with the items associated with each other in FIG. 9.

FIG. 10 is a diagram illustrating an example of the process management-word relationship table R20.

As shown in FIG. 10, in the process management-word relationship table R20, a process management word in the process FMEA which often appear in a corresponding manner is stored for each field with respect to each process management word that appears in the measure field of the design FMEA. The process management word in the design FMEA often appears in the measure field, and a process management word in the process FMEA relevant to the above process management word often appears in the requirement field, the failure mode field, or the cause field. Therefore, in the embodiment, the relationship of the process management words is extracted only from those fields. Note that the extraction method for the relationship of the process management words is not limited thereto.

Process Management-Word Relationship Extraction Processing

Next, a process management-word relationship extraction Processing in the word relationship extraction unit 31 will be described.

FIG. 11 is a flowchart of the process management-word relationship extraction processing in the word relationship extraction unit 31.

In the embodiment, a description will be given of a case of using a word co-occurrence network in the process management-word relationship extraction processing. A field name or a word is registered in the node of the word co-occurrence network, and a field name or a word that co-occurs with the above field name or word is coupled to the node by a link. A word in the document item in the design FMEA and a word in the document item block in the process FMEA which corresponds to the above word are regarded as co-occurring.

First, in Step S201, the word relationship extraction unit 31 extracts a process management word (hereinafter may be referred to as a word) from the field of the item T11-1 in the design FMEA T11 (the upstream-process document). The word relationship extraction unit 31 extracts a word by morphological analysis, removal of the word by using general stop words, or some other method. In the embodiment, a word "penetration" is thereby extracted.

In Step S202, the word relationship extraction unit 31 searches words in the word co-occurrence network to determine whether or not the word extracted in Step S201 ("penetration" in the embodiment) is present. When determining that the extracted word ("penetration") is present in the word co-occurrence network (Step S202: Yes), the word relationship extraction unit 31 goes to Step S203, and when determining that the extracted word is not present in the word co-occurrence network (Step S202: No), the word relationship extraction unit 31 goes to Step S204 and adds the word ("penetration") or the field name extracted in Step S201 to the word co-occurrence network.

In Step S203, the word relationship extraction unit 31 extracts a word from a corresponding item block 21-1 in the process FMEA T21 (the downstream-process document). In the embodiment, the word relationship extraction unit 31 extracts words from the requirement field, the failure mode field, and the cause field of the item block 21-1 in the process FMEA T21. The word relationship extraction unit 31 extracts words "pipe" and "welding" from the requirement field, extracts words "whole circumstance", "welding", "misalignment", and "penetration" from the failure mode field, and extracts "laser", "displacement", and "lens" from the cause field.

In Step S205, the word relationship extraction unit 31 searches words in the word co-occurrence network to determine whether or not the words extracted in Step S203 ("pipe", "welding", "whole circumstance", "welding", "misalignment", and "penetration" in the embodiment) are present in the word co-occurrence network. When determining that the extracted words are present in the word co-occurrence network (Step S205: Yes), the word relationship extraction unit 31 goes to Step S206, and when determining that the extracted words are not present in the word co-occurrence network (Step S205: No), the word relationship extraction unit 31 goes to Step S207 and adds the words or the field names extracted in Step S203 to the word co-occurrence network.

In Step S206, the word relationship extraction unit 31 associates links between the words in the item T11-1 in the design FMEA T11 (the upstream-process document) extracted in Step S201 and the words in the item T21-1 in the process FMEA T21 (the downstream-process document) extracted in Step S203, and adds weight of 1 to each link.

In Step S208, the word relationship extraction unit 31 determines whether or not the processing has been performed on the downstream-process document (the process FMEA T21) corresponding to a predetermined upstream-process document (the design FMEA T11).

When determining that the processing on all the downstream-process documents corresponding to the predetermined upstream-process document has been completed (Step S208: Yes), the word relationship extraction unit 31 goes to Step S209, and when determining that the processing on all the downstream-process documents has not been completed (Step S208: No), the word relationship extraction unit 31 returns to Step S203 and repeats the processing from Steps S203 to S208 until determining that the processing on all the downstream-process documents has been completed.

In Step S209, the word relationship extraction unit 31 determines whether or not the processing from Steps S201 to S208 has been performed on all the other upstream-process documents (the design FMEA T11, the design FMEA T12).

When determining that the processing has been performed on all the other upstream-process documents (Step S209: Yes), the word relationship extraction unit 31 goes to Step S210, and when determining that the processing has not been performed on all the other upstream-process documents (Step S209: No), the word relationship extraction unit 31 returns to Step S201 and repeats the processing from Steps S201 to S209 until determining that the processing on all the upstream-process documents has been completed.

Here, when the word relationship extraction unit 31 processes the items T12-1, T12-2 in the design FMEA T12 being the upstream-process documents, since the predetermined words and field names have been registered in the word co-occurrence network by the processing from Steps S201 to S208 on the items T11-1, T11-2 in the design FMEA T11 processed before, it is determined that the extracted word is present in the word co-occurrence network in Step S202 and Step S205 (Step S202 and Step S205: Yes), and the processing in Step S204 and Step S207 is not performed.

When the word relationship extraction unit 31 performs the processing on the process FMEA T22 corresponding to the design FMEA T12, in Step S205, it is determined the words "requirement: penetration", "inner diameter: rattling" are not present in the word co-occurrence network (Step S205: No), and while these words are newly added to the word co-occurrence network (Step S207), and a link is added between the words in the upstream-process document and the downstream-process document and then weight of 1 is added to this link (Step S206).

Further, in the processing of the process FMEA T22 corresponding to the design FMEA T12 by the word relationship extraction unit 31, links between the words "measure: penetration" already present in the upstream-process document and the words "failure mode: whole circumstance, misalignment, penetration, and insertion" already present in the downstream-process document are added with another weight of 1 (a total weight is 2).

In Step S210, the word relationship extraction unit 31 nullifies a link in the word co-occurrence network that has a weight lower than a predetermined threshold (e.g., a threshold of 1).

Then, in Step S211, the word relationship extraction unit 31 acquires only a node (a word) in the item (e.g., the items T11-1, 11-2, 12-1, 12-2) in the upstream-process document (e.g., the design FMEA T11, T12) from the word co-occurrence network, and stores the acquired node into the leftmost row of the word relationship table R20 shown in FIG. 10. The word relationship extraction unit 31 then stores the word coupled to the acquired node by a link in another row of the process management-word relationship table R20, to create the process management-word relationship table R20 (see FIG. 10).

In the embodiment, "requirement: pipe, welding" in the item T21-1 in the downstream-process document T21 and "requirement: penetration" in the item T22-1 in the downstream-process document T22 appear just once, so that the link is nullified in Step S210. As a result, no word is stored in the requirement field in the downstream-process document (the process FMEA) in the word relationship table R20.

From the above processing, the word relationship extraction unit 31 creates the process management-word relationship table R20 taking a word in the upstream-process document (the design FMEA) as a key.

The word relationship extraction unit 31 extracts the process management-word relationship between the upstream-process document and the downstream-process document when a new correspondence relation data between new document items is created. A node is added based on the correspondence relation between the items newly added to the word co-occurrence network. When the weight of the link exceeds the threshold due to the addition, a new word is added to the process management-word relationship table R20.

Although the method using the word co-occurrence network has been shown in the embodiment, a word group that frequently appears between the corresponding items in the documents may only be extracted, and an existing clustering technique or the like may be used.

Item-Item Coupling Relationship Table

Next, item-item coupling relationship tables R30, R31 created by the item-item coupling relation extraction unit 32 will be described.

FIG. 12 is a diagram illustrating an example of the item-item coupling relationship table R30.

FIG. 13 is a diagram illustrating an example of the item-item coupling relationship table R31.

The item-item coupling relationship table R30 shown in FIG. 12 is an example of the data table representing the coupling relationship between the design FMEA T11, T12 of FIG. 9. As shown in FIG. 12, the relation among the fields is stored by the tree structure with the document name taken as a root node and each field of the part, the function, the failure mode, the cause, the effect, and the measure as the node.

In FIG. 12, R30-1 corresponds to the item T11-1 of FIG. 9, and R30-2 corresponds to the item T11-2 of FIG. 9. In each node, a word extracted from each field in the upstream-process document (the design FMEA T11 in the embodiment) is stored (not shown).

In FIG. 13, the item-item coupling relationship table R31 is an example of the coupling relationship data of the process FMEA T21, 22 of FIG. 9. As shown in FIG. 13, the relation among the fields is stored by the tree structure with the document name taken as a root node and each field of the process, the requirement, the failure mode, the cause, the effect, and the measure as the node.

In FIG. 13, R31-1 corresponds to the item T12-1 of FIG. 9, R31-2 corresponds to the item T12-2 of FIG. 9, and R31-3 corresponds to the item T12-3 of FIG. 9.

The item-item coupling relationship tables R30, R31 described above are created by item-item coupling relation extraction processing in the item-item coupling relation extraction unit 32.

Item-Item Coupling Relation Extraction Processing

Next, the item-item coupling relation extraction processing in the item-item coupling relation extraction unit 32 will be described.

FIG. 14 is a flowchart of the item-item coupling relation extraction processing.

First, a description will be given of a procedure for creating the item-item coupling relationship table R30 from the upstream-process document (the design FMEA T11).

In Step S301, the item-item coupling relation extraction unit 32 creates the tree structure of the upstream-process document (the design FMEA T11). Specifically, taking a document name as a root node, the item-item coupling relation extraction unit 32 creates, below the document name, nodes of part names just by the number of part fields. In the case of the design FMEA T11, two tree structures (R30-1 and R30-2) are created. Subsequently, below the part node, function nodes are created just by the number of function fields. Thereafter, nodes are created in the same manner.

In Step S302, the item-item coupling relation extraction unit 32 extracts a word for each field in the upstream-process document (the design FMEA T11).

Then in Step S303, the item-item coupling relation extraction unit 32 registers the word extracted in Step S302 into each node. The method for extracting the word in the item-item coupling relation extraction unit 32 is a similar method to the word extraction processing (Step S201 of FIG. 11) in the word relationship extraction unit 31.

From the above, the item-item coupling relation extraction unit 32 creates the item-item coupling relationship table R30. The item-item coupling relationship table R30 is created when each document is first registered into the document database 21.

The item-item coupling relationship table R31 is also created by the item-item coupling relation extraction unit 32 based on the downstream-process document (the process FMEA T21).

By the method described above, the process management-word relationship table R20 and the item-item coupling relationship table R30 are created. In the following, a flow of calculation of an item-item correspondence degree performed using the above tables will be described.

Item-Item Correspondence Degree Calculation Processing

The item-item correspondence degree is calculated by the item-item correspondence degree calculation unit 33.

FIG. 15 is a flowchart of the item-item correspondence degree calculation processing in the item-item correspondence degree calculation unit 33.

First, in Step S401, the item-item correspondence degree calculation unit 33 extracts a word from each field in a searched sentence item in an upstream-process document (design FMEA), specified by the user. The word extracting method is similar to that in Step S201 of FIG. 11.

In Step S402, the item-item correspondence degree calculation unit 33 converts a part name, out of the words in the upstream-process document (design FMEA) extracted in Step S401, to a part name being used in the downstream-process document (the process FMEA) by using the process management-word relationship table R20 (see FIG. 10).

The item-item correspondence degree calculation unit 33 does not perform conversion unless process management-word relationship table R20 has not been created. Further, the item-item correspondence degree calculation unit 33 expands the process management word out of the extracted words by using the process management-word relationship table R20. For example, when the item in the design FMEA, instructed by the user, is T11-1 of FIG. 9, the item-item correspondence degree calculation unit 33 expands the words "penetration" in the measure field to the words "whole circumstance", "welding", "misalignment", and "penetration" with reference to the process management-word relationship table R20 (FIG. 10). Here, the expansion may also be performed by using a general similar word or synonym dictionary.

In Step S403 and Step S404, the item-item correspondence degree calculation unit 33 acquires a downstream-process document (process FMEA), specified by the user as a search target (Step S403), and acquires one item block concerning the requirement (Step S404). For example, when the process FMEA T22 corresponding to the design FMEA T12 shown in FIG. 9 is instructed as the search target, the item-item correspondence degree calculation unit 33 determines that the corresponding item block is T12-1 with reference to the item-item coupling relationship table R31 (see FIG. 13), and performs processing on this.

In Step S405, the item-item correspondence degree calculation unit 33 compares words in each field in the item T11-1 in the upstream-process document (the design FMEA T11) and each field in the item block T21-1 in the downstream-process document (the process FMEA T21), and calculates the correspondence degree score. The word in each field in the item block T12-1 has been extracted in the item-item coupling relationship table R31 (see FIG. 13).

The item-item correspondence degree calculation unit 33 may compare a combination of all the fields, or which field is to be compared with which field may be determined in advance in accordance with the tendency of contents of description in the design FMEA and the process FMEA. The correspondence degree score is calculated in accordance with word correspondence by using a Jaccard coefficient or the like. At the time of calculating the correspondence degree score, the expanded process management word is also used as the word in the measure field of the item 11-1. Hence, even when different process management words are used between the design FMEA and the process FMEA, it is possible to calculate a high correspondence degree score for the item block in the corresponding process FMEA.

In Step S406, the item-item correspondence degree calculation unit 33 calculates the correspondence degree score for the entire item from the correspondence degree score for each field described above. In accordance with the tendency of contents of description in the design FMEA and the process FMEA, a correspondence degree score weight for each field to be compared is determined in advance, and the correspondence degree score for each field is multiplied by that weight and summed up, to obtain a correspondence degree for each item.

In Step S407, the item-item correspondence degree calculation unit 33 sums up the correspondence degree score for each item obtained in Step S405 and divides the total by the number of items in the item block to obtain the correspondence degree score for the entire item block. Alternatively, the maximum value of the correspondence degree score for each item may be taken as the correspondence degree score for the item block.

By the processing from Step S401 to S407 in the item-item correspondence degree calculation unit 33 described above, the correspondence degree score for the item (T21-1) in the downstream-process document (the process FMEA T21) which corresponds to one item (T11-1) in the specified upstream-process document (the design FMEA T11) and the correspondence degree score for the item block are calculated.

In Step S408, the item-item correspondence degree calculation unit 33 determines whether or not all the item blocks in the downstream-process document (the process FMEA T21) specified as the search target by the user have been processed. When determining that all the item blocks in all the downstream-process documents T21 have been processed (Step S408: Yes), the item-item correspondence degree calculation unit 33 goes to Step S409, and when determining that all the item blocks have not been processed (Step S408: No), the item-item correspondence degree calculation unit 33 returns to S404, acquires another one item block (e.g., T21-2) in the downstream-process document (the process FMEA T21), and performs Step S405 to Step S407 on the acquired item block (T21-2). Therefore, the item-item correspondence degree calculation unit 33 can also calculate the correspondence degree score for another item block T21-2 in the downstream-process document T21.

The item-item correspondence degree calculation unit 33 also performs the same processing (Steps S405 to Step 407) on still another item T21-3 in the downstream-process document (the process FMEA T21) in a similar manner to the above, to calculate the correspondence degree score for this item block T21-3.

After sequentially calculating the correspondence degree scores concerning all the item blocks T21-1, T21-2, and T21-3 in the downstream-process document (the process FMEA T21), the item-item correspondence degree calculation unit 33 goes to Step S409, and determines whether or not the processing from Step S404 to Step S408 has been performed on all the downstream-process documents (the process FMEA T21, T22) in the specified search range.

When determining that the processing on all the downstream-process documents (the process FMEA T21, T22) in the specified search range has not been completed (Step S409: No), the item-item correspondence degree calculation unit 33 returns to Step S403 and repeats this processing until Step S404 to Step S408 on all the downstream-process documents (the process FMEA T21, T22) have been completed, and when determining that the processing on all the downstream-process documents (the process FMEA T21, T22) has been completed (Step S409: Yes), the processing is completed.

Next, another method for calculating the item-item correspondence degree has been described.

In another method described below, the correspondence degree is calculated using a similarity of the item-item coupling relation to an existing document already truly associated by the user. The user specifies in advance the associated design FMEA and process FMEA to be used for the similarity detection. In the embodiment, a description will be given of an example of a case where the associated design FMEA T11 and process FMEA T21 are specified by the user.

Item-Item Correspondence Relation Table

Prior to description of another method for calculating the item-item correspondence degree, item-item correspondence relation tables R40, R41, R42 will be described using FIGS. 16 to 18.

FIG. 16 is a diagram illustrating an example of the item-item correspondence relation table R40.

FIG. 17 is a diagram illustrating an example of the item-item correspondence relation table R41.

FIG. 18 is a diagram illustrating an example of the item-item correspondence relation table R42.

The item-item correspondence relation tables R40, R41, R42 are examples of the item-item correspondence relation table. In the item-item coupling relationship tables R40 to R42, the correspondence relation between a predetermined upstream-process document (design FMEA T11) and a downstream-process document (a process FMEA T21) corresponding thereto is stored.

As shown in FIG. 16, the item-item correspondence relation table R40 shows to which corresponding item block (ID) and which corresponding item (ID) in the corresponding downstream-process document (the process FMEA T21) each item (ID) in the upstream-process document (the design FMEA T11) corresponds.

The example of the embodiment shows that the first item (an item ID: 1) in the upstream-process document (the design FMEA T11) corresponds to the third item block (an item block ID: 3) in the downstream-process document (the process FMEA T21), and further correspond to the fifth and sixth items (item IDs: 5, 6). Further, for example, it is shown that the second item (an item ID: 2) in the upstream-process document (the design FMEA T11) corresponds to the 105th item block (an item block ID: 105) in the downstream-process document (the process FMEA T21), and further correspond to the 436th item (an item ID: 436).

As shown in FIG. 17, the item-item correspondence relation table R41 shows to which corresponding item (ID) in the upstream-process document (the design FMEA T11), each item block (ID) in the downstream-process document (the process FMEA T21) corresponds.

The example of the embodiment shows that the first item block (an item block ID: 1) in the downstream-process document (the process FMEA T21) corresponds to the 55th item (an item ID: 55) in the upstream-process document (the design FMEA T11). Further, for example, it is shown that the third item block (an item block ID: 3) in the downstream-process document (the process FMEA T21) corresponds to the first item (an item ID: 1) in the upstream-process document (the design FMEA T11).

As shown in FIG. 18, the item-item correspondence relation table R42 shows to which corresponding item (ID) in the upstream-process document (the design FMEA T11) each item block (ID) in the downstream-process document (the process FMEA T21) corresponds.

The example of the embodiment shows that the first item block (an item block ID: 1) in the downstream-process document (the process FMEA T21) corresponds to the 55th item (an item ID: 55) in the upstream-process document (the design FMEA T11). Further, for example, it is shown that the fifth item block (an item block ID: 5) in the downstream-process document (the process FMEA T21) corresponds to the first item (an item ID: 1) in the upstream-process document (the design FMEA T11).

These IDs are linked to the respective nodes in the item-item coupling relation tables R30 (see FIG. 12), R31 (see FIG. 13), and the use of these IDs enables understanding of a tree structure in each item block and words in each node in the tree.

Another Item-Item Correspondence Degree Calculation Method

Next, another item-item correspondence degree calculation processing in the item-item correspondence degree calculation unit 33 will be described.

FIG. 19 is a flowchart of another item-item correspondence degree calculation processing in the item-item correspondence degree calculation unit 33.

FIG. 20 is a flowchart of another item-item correspondence degree calculation processing in the item-item correspondence degree calculation unit 33.

In Step S501, the item-item correspondence degree calculation unit 33 acquires one item block (a tree structure of a sub-assy) in the downstream-process document (the process FMEA), specified by the user as the search target. This downstream-process document specified by the user is a process FMEA yet to be associated.

In Step S502, the item-item correspondence degree calculation unit 33 acquires one item (a tree structure of a sub-assy) in a downstream-process document (e.g., the process FMEA T21) having been associated in the past.

In Step S503, the item-item correspondence degree calculation unit 33 determines whether or not the tree structure of the item block acquired in Step 501 and the tree structure of the item block acquired in Step S502 are the same. When determining that the tree structures are the same (Step S503: Yes), the item-item correspondence degree calculation unit 33 goes to Step S504, and when determining that the tree structures are not the same (Step S503: No), the item-item correspondence degree calculation unit 33 goes to Step S505.

In Step S504, the item-item correspondence degree calculation unit 33 determines the correspondence relation between each node in the item block acquired in Step S501 and each node in the item block acquired in Step S502 and calculates the similarity of the entire item block.

Specifically, when determining that the shape of the tree structure of the item block acquired in Step S501 and the shape of the tree structure of the item block acquired in Step S502 completely match and the correspondence relation between the nodes can thus be determined uniquely, the item-item correspondence degree calculation unit 33 refers to words included in the node in each item block to calculate the similarity of the words for each node. The item-item correspondence degree calculation unit 33 sums up all the similarities calculated for the respective nodes to calculate the similarity score for the entire item block.

Here, when determining that the correspondence relation between the nodes in each item block cannot be determined uniquely, the item-item correspondence degree calculation unit 33 calculates the similarity score in patterns of all nodes that can correspond, and sets the maximum thereamong as a similarity score.

In Step S505, the item-item correspondence degree calculation unit 33 determines whether or not the processing of calculating a similarity score for one item block in the downstream-process document (the process FMEA), specified by the user, and all the item blocks in the downstream-process document (the process FMEA T21) associated in the past has been completed. When determining that the processing of calculating the similarity score for all the item blocks has been completed (Step S505: Yes), the item-item correspondence degree calculation unit 33 goes to Step S506, and when determining that the processing of calculating the similarity score for all the item blocks has not been completed (Step S505: No), the item-item correspondence degree calculation unit 33 returns to Step S502 and repeats the processing from Steps S502 to S505 until determining that the processing of calculating the similarity scores with respect to all the item blocks in the downstream-process document associated in the past has been completed.

In Step S506, the item-item correspondence degree calculation unit 33 extracts the item block in the downstream-process document (the process FMEA), specified by the user, and the item block in the downstream-process document (the process FMEA T21), having a similar tree structure and associated in the past. The item-item correspondence degree calculation unit 33 determines whether or not the tree structures are similar based on whether or not the item blocks have the similarity scores equal to or higher than a predetermined threshold set in advance.

Here, depending on the tree structure of the item block in the downstream-process document (the process FMEA), specified by the user, and the tree structure of the item block in the downstream-process document (the process FMEA T21), associated in the past, multiple item blocks having similar tree structures as that of the item block being the search target specified by the user may be extracted.

In Step S507, with reference to an item-item correspondence relation table R41, the item-item correspondence degree calculation unit 33 extracts an item in the upstream-process document (the design FMEA T11) which corresponds to the item block in the downstream-process document (the process FMEA T21) having a similar tree structure extracted in Step S506. For example, the 55th item (an item: 55) in the upstream-process document (the design FMEA T11) corresponds to the first item block (an item block ID: 1) in the downstream-process document (the process FMEA T21). Note that the items in the upstream-process document (the design FMEA T11) are extracted in the same number as the number of item blocks in the downstream-process document (the process FMEA T21) having the similar tree structure.

In Step S508, the item-item correspondence degree calculation unit 33 determines whether or not the processing from Step S501 to Step S507 on all the item blocks in the downstream-process document, specified by the user as the search target has been completed. When determining that the processing on all the item blocks has been completed (Step S508: Yes), the item-item correspondence degree calculation unit 33 goes to Step S509, and when determining that the processing on all the item blocks has not been completed (Step S508: No), the item-item correspondence degree calculation unit 33 returns to Step S501 and repeats the processing from Steps S501 to S507 until determining that the processing on all the item blocks has been completed.

As shown in FIG. 20, in Step S509, the item-item correspondence degree calculation unit 33 extracts a word included in the item (node) in the upstream-process document (the design FMEA), specified by the user as the search target.

In Step S510, the item-item correspondence degree calculation unit 33 converts or expands the word extracted in Step S509 by using the process management-word relationship table R20 (see FIG. 10). For example, as shown in FIG. 10, by using the process management-word relationship table R20 (see FIG. 10), the item-item correspondence degree calculation unit 33 converts the word "penetration" in the measure field in the upstream-process document to the words "whole circumstance", "welding", "misalignment", and "penetration" in the failure mode field in the downstream-process document. Other words are converted or expanded in the same manner.

In Step S511, the item-item correspondence degree calculation unit 33 acquires one item block in the downstream-process document (the process FMEA), specified by the user as the search target.

In Step S512, the item-item correspondence degree calculation unit 33 compares the word (the converted or expanded word) in each field of the item in the upstream-process document (the design FMEA) acquired in Step S509 and the word in each field of the item block in the downstream-process document (the process FMEA) acquired in Step S511, to calculate a correspondence degree score.

To which item in the downstream-process document (the process FMEA) each item in the upstream-process document, specified by the user, each item in the upstream-process document (the design FMEA), specified by the user, corresponds is determined based on the item-item correspondence relation tables R41, R42 described above.

In Step S513, the item-item correspondence degree calculation unit 33 calculates the correspondence degree score for the entire item from the correspondence degree score for each field described above. In accordance with the tendency of contents of description in the design FMEA and the process FMEA, a correspondence degree score weight for each field to be compared is determined in advance, and the correspondence degree score for each field is multiplied by that weight, to calculate the correspondence degree score for each item.

In Step S514, the item-item correspondence degree calculation unit 33 sums up the correspondence degree score for each item obtained in Step S513 and divides the total by the number of items in the item block to calculate a correspondence degree score 1 for the entire item block. Alternatively, the maximum value of the correspondence degree score for each item may be taken as the correspondence degree score 1 for the item block.

By the processing from Step S509 to S514 in the item-item correspondence degree calculation unit 33 described above, the correspondence degree score for the item in the downstream-process document (the process FMEA) which corresponds to one item in the specified upstream-process document (the design FMEA) and the correspondence degree score for the item block are calculated.

In Step S515, the item-item correspondence degree calculation unit 33 acquires one item in the upstream-process document (the design FMEA T11), associated in the past and corresponding to each item in the downstream-process document (the process FMEA), specified by the user based on the item-item correspondence relation tables R41, R42 described above.

In Step S516, the item-item correspondence degree calculation unit 33 calculates a similarity score of one item in the upstream-process document (the design FMEA), specified by the user and acquired in Step S509, and one item in the upstream-process document (the design FMEA T11), associated and acquired in Step S515. A word in the item in the upstream-process document (the design FMEA), extracted in Step S507, is obtained with reference to the item-item coupling relationship table R31 (see FIG. 13) and then compared with the word extracted in Step S509 to obtain a similarity score for each field, and the similarity score for each field is summed up to calculate the similarity score of the entire item.

In Step S517, the item-item correspondence degree calculation unit 33 determines whether or not the similarity score of all the items in the associated upstream-process document, acquired in Step S515 with respect to one item in the upstream-process document, acquired in Step S509, has been calculated. When determining that the similarity score of all the items has been calculated (Step S517: Yes), the item-item correspondence degree calculation unit 33 goes to Step S518, and when determining that the similarity score of all the items has not been calculated (Step S517: No), the item-item correspondence degree calculation unit 33 returns to Step S515 and repeats the processing from Step S515 to Step S517 until the calculation of the similarity score of all the items is completed.

In Step S518, the item-item correspondence degree calculation unit 33 sets the maximum value of the similarity scores of all the items calculated in the processing from Step S515 to Step S517 as a correspondence degree score 2 based on the item-item coupling relation similarity to the item block in the downstream-process document (the process FMEA) being the search target.

In Step S519, the item-item correspondence degree calculation unit 33 adds predetermined weights respectively to the correspondence degree score 1 calculated in Step S514 and the correspondence degree score 2 calculated in Step S518 to calculate an overall correspondence degree score.

In Step S520, the item-item correspondence degree calculation unit 33 determines whether or not the processing from Step S511 to Step S519 has been performed on all the item blocks in the downstream-process document (the process FMEA), specified by the user as the search target. When determining that the processing has been performed (Step S520: Yes), the item-item correspondence degree calculation unit 33 completes the processing, and when determining that the processing has not been performed (Step S520: No), the item-item correspondence degree calculation unit 33 returns to Step S511 and repeats the processing from Steps S511 to S519 until determining that the processing on all the item blocks has been completed.

From the above, the correspondence degree score of the item block in the process FMEA with respect to the searched sentence item in the design FMEA, specified by the user as the search target, is calculated.

In the above, for simplicity of the description, the item-item coupling relation similarity has been calculated at the time of associating items in the documents. This calculation may be performed at the time of registering a new document. Alternatively, in order to access similar coupling relations together, a link may be posted in advance therebetween.

Document-Document Description Checking Method

Next, a description will be given of a procedure for supporting addition of the correspondence relation between items by using the information processing system 1 according to the embodiment and a procedure for checking whether the contents described in the upstream-process document (the design FMEA) have been fully described in the downstream-process document (the process FMEA).

FIG. 21 is an example of a support screen for addition of an item-item correspondence relation and missing/omission checking.

In FIG. 21, D21 is a screen for selecting an item in the design FMEA which is to be associated by the user. D22 is a screen for selecting an item, to which the user truly corresponds, out of the corresponding candidate items presented by the system. D23 denotes a screen on which the original process FMEA including the corresponding candidate items are displayed.

First, the user specifies a document name of an upstream-process document (the design FMEA) which is to be associated first. In response, the information processing system 1 displays on D21 the contents of description in the design FMEA, specified by the user. The user presses a search selection button D21-1 to select one item in the design FMEA, and presses a search button D21-1 to instruct a corresponding candidate to the system.

The information processing system 1 displays a list of corresponding candidate items on the screen D22. Specifically, the information processing system 1 sorts item blocks by the correspondence degree score for each item block obtained in S407 of FIG. 15 or S514 of FIG. 20, to display the item blocks in the descending order of the correspondence degree scores.

The user presses a correspondence selection button in D22-1 to select a truly corresponding item. There are two kinds of correspondence selection buttons that are a button (D22-1, left) for selection of each item block, and a button (D22-1, middle) for selection of each item, and it is possible to both select the entire item block and select an individual item as the corresponding process FMEA. The correspondence selection button can be pressed multiple times.

Here, in the embodiment, only the item blocks as the corresponding candidates are displayed on the screen D22. When the user is to check the entire document, the user selects an item in the process FMEA to be checked by using the original display button D22-1 on the right and presses the original display button D22-2.

Hence, the original process FMEA including the items selected in D22-1 is displayed on a screen D23. The selected item is highlighted. The user can view the screen D23 and consider whether or not the currently selected item is certainly an item corresponding to the design FMEA.

While alternatively viewing the screen D22 and the screen D23, the user checks whether all corresponding items have been described in the original process FMEA, selects all corresponding items using D22-1, and press a selection fixing button D22-3. When this button is pressed, the information processing system 1 stores a true correspondence relation in the item-item correspondence relation database 22.

At the time of the user checking the original process FMEA, when the corresponding item is not described in the original process FMEA, the user edits the screen D23 to add a necessary item and presses a button D23-1 to notify the addition to the information processing system 1. The information processing system 1 stores the added item in the document database 21 and the item thereto. Further, the information processing system 1 stores the correspondence relation between the selected item in the design FMEA and the added item in the process FMEA into the item-item correspondence relation database 22 and updates the item therein.

Next, a description will be given of another example of a support screen D30 for addition of the item-item correspondence relation and missing/omission checking.

D30 of FIG. 22 is a diagram illustrating another example of the support screen for addition of the item-item correspondence relation and missing/omission checking.

In FIG. 22, D31 is a screen for selecting an item in the design FMEA which is to be associated by the user. D32 is a screen for selecting an item, to which the user truly corresponds, out of the corresponding candidate items presented by the information processing system 1. D33 is a screen on which the original process FMEA including the corresponding candidate items are displayed.

The screen D31 is the same as the screen D21 of FIG. 21 described above, and the screen D33 is the same as the screen D23 of FIG. 21 described above. On the screen D32, differently from the screen D22 of FIG. 21 described above, the information processing system 1 sorts the items by the correspondence degree score for each item (field), obtained in S405 of FIG. 15 and displays the items in the descending order of the scores.

The user's procedure using FIG. 22 is almost the same as FIG. 21 described above. The user presses the correspondence selection button in the D32-1 to select the truly corresponding item, but cannot select the item block since the display is created by item. When the item is selected by the original display button D32-1 and a button D32-2 is pressed, the original process FMEA including the present item is displayed as in FIG. 21.

As described above, the user can easily add a correspondence relation between items in the different existing documents. Further, the user can simultaneously check whether or not the contents described in the upstream-process document are fully described in the downstream-process document.

As described above, the embodiment includes:

(1) the document reception unit 10 (a document data reception unit) configured to receive multiple pieces of document data; the data storage unit 20 (a document data storage unit) configured to store the received multiple pieces of document data; and the correspondence relation estimation unit 30 configured to estimate a correspondence relation at least between an item in a first document data and an item in a second document data out of the multiple pieces of document data stored in the data storage unit 20. The correspondence relation estimation unit 30 includes the item-item coupling relation extraction unit 32 configured to extract a coupling relation among items in the first document data and a coupling relation among items in the second document data, and the word relationship extraction unit 31 configured to extract a relevance between a word that appears in an item in the first document data and a word that appears in an item in the second document data.

With such a configuration, the item-item coupling relation extraction unit 32 can appropriately associate items in each document based on the coupling relation among items in the extracted first document data (e.g., the design FMEA) and the coupling relation among items in the second document data (e.g., the process FMEA).

(2) It is configured such that the item-item coupling relation extraction unit 32 compares the extracted coupling relation among the items in the first document data and the extracted coupling relation among items in the second document data, and estimates the items having the corresponding coupling relations as items having a correspondence relation, and the word relationship extraction unit 31 estimates that there is a relevance between a word included in the item in the first document data and a word included in the item in the second document data.

With such a configuration, the item-item coupling relation extraction unit 32 estimates items having the corresponding coupling relation as items having a correspondence relation, and can thus estimate the relevance of words included in the respective items more reliably.

(3) It is configured such that the item-item coupling relation extraction unit 32 represents by a tree structure each of the coupling relation among the items in the first document data and the coupling relation among the items in the second document data, and compares the tree structure of the first document data and the tree structure of the second document data to estimate a correspondence relation between items having identical or similar tree structures.

With such a configuration, the coupling relation among the items in the document is represented by the tree structure to enable more appropriate estimation of the correspondence relation.

(4) It is configured such that the first document data is design FMEA (design document data) on a design process, and the second document data is process FMEA (process document data) on a manufacturing process, the design FMEA includes at least the parts list T30 (a first parts list data) for parts constituting a product designed in the design process, the process FMEA at least includes the parts list T31 (a second parts list data) for parts constituting the product manufactured in the manufacturing process, and the word relationship extraction unit 31 extracts a relevance between a part name word of each of the parts constituting the parts list T30 and a part name word of each of the parts constituting the parts list T31.

With such a configuration, it is possible to appropriately extract the relevance of the part name words in the design FMEA being the upstream-process document and the process FMEA being the downstream-process document.

(5) It is configured such that the system further includes the data presentation unit 60 (a correspondence relation presentation unit) configured to present a coupling relation among items in the design FMEA and the coupling relation among items in the process FMEA, and the correspondence relation presentation unit presents by a tree structure (a screen D11 of FIG. 8) the coupling relation among items in the design FMEA, and presents by a tree structure (the screen D12 of FIG. 8) the coupling relation among items in the process FMEA.

With such a configuration, the tree structure among items in the design FMEA and the tree structure among items in the process FMEA can be confirmed while visually recognized, to improve the operability of the user.

(6) It is configured such that the data presentation unit presents an item in the design FMEA and an item in the process FMEA (the screens D21, D22 of FIG. 21), and presents the design FMEA and the process FMEA (the screen D23 of FIG. 21).

With such a configuration, the tree structure among items in the design FMEA and the tree structure among items in the process FMEA can be confirmed while visually recognized, to improve the operability of the user.

(7) It is configured such that the word relationship extraction unit 31 is configured to learns a pair of words having a high relevance between the individual items based on the coupling relation among items in the design FMEA and the coupling relation among items in the process FMEA, and the data presentation unit 60 (the correspondence relation presentation unit) presents a correction candidate for a word used in the item in the design FMEA and a word used in the item in the process FMEA based on the pair of words having the high relevance, learned by the word relationship extraction unit 31.

With such a configuration, the word relationship extraction unit 31 updates the word used in the design FMEA and the word used in the process FMEA to a word corrected by the user, to more appropriately associate the words.

Second Embodiment

In an information processing system according to a second embodiment described below, a description will be given of support at the time when, after addition of the relationship between the existing documents by the procedure of the information processing system 1 according to the first embodiment described above, by using this, a document on the next-generation product is created or a document at the time of changing the process is changed. Further, a description will also be given of support for gradually integrating words to be used at the time of creating or changing a document.

A flow of support for creation of the next-generation product document will be described using FIG. 5 described above.

The user instructs, to the user's instruction reception unit 50, a document name in the design FMEA and the process FMEA one generation before, creation of a copy thereof, and a document name after the copying, via the input apparatus 210.

The user's instruction reception unit 50 transmits the information instructed by the user to the data update unit 40. The data update unit 40 creates a copy of the document data in the document database 21 and adds a document name to the copy. The data update unit 40 further changes document names of the item-item correspondence relation database 22 and the item-item coupling relation database 24, and make copies thereof. In the copied item-item correspondence relation database 24, the correct correspondence relation is stored due to the user having specified only the true correspondence relation concerning the document before copying.

The user instructs the user's instruction reception unit 50 to update the copied design FMEA and process FMEA and instructs display of the design FMEA, via the input apparatus 210. The information processing system 1 displays to the user the design FMEA copied by the data presentation unit 60 via the display apparatus 220 based on instruction information acquired by the user's instruction reception unit 50.

The user considers a point of change in the next-generation Product while viewing the displayed list of design FMEA. When there is a change, the user instructs the user's instruction reception unit 50 to make the change, and the data update unit 40 updates the document database 21. The user instructs the user's instruction reception unit 50 to display the item in the process FMEA corresponding to the changed item in the design FMEA, thereby displaying the list of the items in the process FMEA to which the data presentation unit 60 corresponds, via the display apparatus 220.

The user selects an item to be changed in accordance with a change in the design FMEA from the displayed list of the items in the process FMEA and instructs the user's instruction reception unit 50 to display the original process FMEA.

The user's instruction reception unit 50 instructs the data storage unit 20 and the data presentation unit 60 to display the original process FMEA. The user refers to the original process FMEA and makes a necessary change.

When the user changes the original process FMEA, the data presentation unit 60 presents candidates for the word to be used simultaneously with the original process FMEA so as to gradually integrate the words to be used. The procedure for this is as follows.

In the information processing system 1, upon receipt of instruction from the user to display the original process FMEA, the user's instruction reception unit 50 instructs the data storage unit 20 to display candidates for the word to be used. The data storage unit 20 acquires a process management word relevant to the word in the item in the design FMEA, selected by the user, with reference to the process management-word relationship table R20 in the word relationship database 23.

Words in the process management-word relationship table R20 are subjected to elimination based on the frequency of use by using a threshold, so that only words having been used frequently in the process FMEA in the past are acquired. The data presentation unit 60 presents the acquired words to the user via the display apparatus 220.

The user changes the original process FMEA by using the presented words as many as possible, and instructs the user's instruction reception unit 50 to update the change in the document. The user's instruction reception unit 50 passes the instruction to the data update unit 40, and the contents of the process FMEA in the document database 21 are thus changed.

In the case of changing a part of the initially created document for a minor change in the product, the user instructs, to the user's instruction reception unit 50, a document name in each of the initial design FMEA and process FMEA, creation of a copy thereof, and a document name after the copying. The subsequent procedure is exactly the same as that described above.

FIG. 23 is a diagram illustrating an example of the document change support screen D40 at the time of the user performing the above procedure. D41 is a screen on which the user changes the copied design FMEA. D42 is a screen on which the system displays an item block in the process FMEA corresponding to the item in the design FMEA being changed by the user. D43 is a screen on which the user changes the contents of items in the process FMEA in accordance with changes in items in the design FMEA.

As shown in FIG. 23, when the user changes the item and presses a change save button D41-2 on the screen D40, the information processing system 1 updates the change in the document database 21.

When the user presses a correspondence display button D41-1 to select the item and presses a correspondence display button D41-3, the information processing system 1 displays on the screen D42 a list of item blocks in the process FMEA corresponding to the present item.

On the screen D42, the user presses a change selection button D42-1 to select an item block in the process FMEA which is to be changed in accordance with the change in the item in the design FMEA. When an original display button D42-2 is pressed, the original process FMEA including the selected item clocks in the process FMEA is displayed on the screen D43. Further, the process management word relevant to the word in the item in the design FMEA, selected in D41-1 is displayed in a word window D43-2.

For example, when the word "penetration" is included in the selected measure field in the design FMEA, with reference to the process management-word relationship table R20, the information processing system 1 displays "whole circumstance", "welding", "misalignment" and the like as the words in the failure mode field in the process FMEA, and "laser", "irradiation", and the like as the words in the cause field.

On the screen D43, the user changes the contents of the displayed item blocks in the process FMEA. In this change, when the contents of change can be appropriately described by using the word displayed on the D43-2, the user uses that word to make a change and presses a change save button D43-1. The information processing system 1 udpates the contents of change in the document database 21.

By the procedure described above, the information processing system 1 can use the upstream-process document (the design FMEA) and the downstream-process document (the process FMEA) one generation before, to which the correspondence relation has already been added, to easily create a document on the next-generation product and update a change in the upstream-process document to the downstream-process document without missing/omission.

Further, the information processing system 1 can use the initial upstream-process document and the downstream-process document, to which the correspondence relation has already been added, to update a change in the upstream-process document to the downstream-process document without missing/omission at the time of a minor change in the product. Moreover, at the time of change in the document, by using the words in the process management word relationship data as much as possible, the information processing system 1 can gradually integrate the word to be used and perform check missing/omission with higher accuracy.

On the screens D22, 32 for displaying a list of corresponding candidate items described above, at the time of sorting item blocks by the correspondence degree score for each item block obtained in S407 of FIG. 15 or S514 of FIG. 20 and displaying the item blocks in the descending order of the correspondence degree scores, the information processing system 1 may apply color coding for each item block with a high correspondence degree and display each item block.

For example, it is configured to create a display with the following color coding: an item block with a high correspondence degree is "red"; an item block with a relatively high correspondence degree is "orange"; an item block with a relatively low correspondence degree is "green"; and an item block with a low correspondence degree is "blue".

With such a configuration, the user can improve the visibility to check an item block with a high correspondence degree in an effective manner.

Further, in the present invention, all the embodiments described above may be combined or any two or more of the embodiments may be preferably combined in a freely selected manner.

The present invention is not limited to one including all the configurations of the embodiments described above. A part of the configuration of any embodiment described above may be replaced with the configuration of another embodiment, or the configuration of any embodiment described above may be replaced by the configuration of another embodiment.

Further, a part of any embodiment described above may be added to, deleted from, or replaced with the configuration of another embodiment.

What is claimed is:

1. A system for information processing that improves document comparison, the system comprising:
    an input/output device configured to receive multiple pieces of document data;
    a memory configured to store the received multiple pieces of document data; and
    a processor communicatively coupled to the input/output device and the memory, the processor configured to
        estimate a correspondence relation at least between an item in a first document data and an item in a second document data out of the multiple pieces of document data,
        extract a coupling relation among items in the first document data and a coupling relation among items in the second document data,
        extract a relevance between a word that appears in an item in the first document data and a word that appears in an item in the second document data, by assigning weights to each word that appears in both the first document data and the second document data,
        determine if the assigned weight is above a predetermined threshold and when the weight is below the predetermined threshold, delete the word,
        convert, for each word with a weight above the predetermined threshold, to at least one additional word as first document converted word data,
        compare words in each field in the first document data with words in each field in the second document data,
        calculate a correspondence degree score based on the comparison and the first document converted word data,
        calculate an item correspondence degree score for the items in the first document data and the items in the second document data,
        calculate overall degree scores for each item based on the calculated correspondence degree score and the calculated item correspondence degree score,
        output, via a display, the overall degree scores,
        receive, via the input/output device, a user selection of one of the overall degree scores, and
        save, via the memory, the user selection and update the item.

2. The system according to claim 1, wherein the processor is further configured to
    compares the extracted coupling relation among items in the first document data and the extracted coupling relation among items in the second document data, and estimates the items having the corresponding coupling relations as items having a correspondence relation, and
    estimates that there is a relevance between a word included in the item in the first document data and a word included in the item in the second document data.

3. The system according to claim 2, wherein the processor is further configured to represents by a tree structure each of the coupling relation among items in the first document data and the coupling relation among items in the second document data, and compare the tree structure of the first document data and the tree structure of the second document data to estimate a correspondence relation between items having identical or similar tree structures.

4. The system according to claim 3, wherein the first document data is design document data on a design process, and the second document data is process document data on a manufacturing process, the design document data includes at least a first parts list data for parts constituting a product designed in the design process, the process document data includes at least a second parts list data for parts constituting the product manufactured in the manufacturing process, and the processor extracts a relevance between a part name word of each of the parts constituting the first parts list data and a part name word of each of the parts constituting the second parts list data.

5. The system according to claim 4, wherein the display is configured to present the coupling relation among items in the first document data and the coupling relation among items in the second document data, and present by a tree structure the coupling relation among items in the first document data, and presents by a tree structure the coupling relation among items in the second document data.

6. The system according to claim 5, wherein the display presents by a tree structure each of the coupling relation among items in the first document data and the coupling relation among items in the second document data, and presents the first document data and the second document data.

7. The system according to claim 6, wherein the processor learns a pair of words having a high relevance between the items based on the coupling relation among items in the first document data and the coupling relation among items in the second document data, and the display presents a correction candidate for a word used in the item in the first document data and a word used in the item in the second document data based on the pair of words having the high relevance, learned by the processor.

8. An information processing method comprising:
acquiring first document data and second document data;
creating a first tree structure that represents a coupling relation among items in the first document data and a second tree structure that represents a coupling relation among items in the second document data;
comparing the first tree structure and the second tree structure to determine whether the structures are identical or similar;
calculating a similarity between an item constituting the first tree structure and an item constituting the second tree structure when the first tree structure and the second tree structure are determined to be identical or similar;
determining a candidate for an item constituting the first tree structure and corresponding to an item constituting the second tree structure, based on the similarity
extracting the item constituting the first tree structure and the corresponding item constituting the second tree structure;
extracting a word included in the item constituting the first tree structure;
converting the word in the item constituting the first tree structure to at least one additional word;
acquiring one item block from the item constituting the second tree structure;
comparing the extracted word and the at least one additional word with a word in the acquired one item block to calculate a correspondence degree score;
calculating the correspondence degree score for each item block from the item constituting the second tree structure;
calculating an item correspondence degree score for the second tree structure using each of the correspondence degree scores for each item block and multiplying each of the correspondence degree scores by a predetermined weight;
calculating a similarity score for the word in the item constituting the first tree structure and an acquired item in the first tree structure that is associated with an item in the second tree structure;
calculating the similarity score for each item in the first tree structure that is associated with an item in the second tree structure;
setting a maximum value of the similarity score for each item as a different corresponding degree score;
calculating overall degree scores based on the calculated correspondence degree score and the calculated different correspondence degree score;
outputting the overall degree scores;
receiving a user selection of one of the overall degree scores; and
saving the user selection and updating the item.

9. The information processing method according to claim 8, wherein the first tree structure and the second tree structure are compared by comparing sub-assemblies constituting the first tree structure and sub-assemblies constituting the second tree structure.

10. The information processing method according to claim 8, wherein each correspondence degree score is assigned an individual predetermined weight, each of the individual predetermined weights can be the same, and each of the individual predetermined weights can be different.

* * * * *